United States Patent
Reddy

(10) Patent No.: US 9,927,974 B2
(45) Date of Patent: Mar. 27, 2018

(54) AUTOMATIC CUSTOMIZATION OF KEYPAD KEY APPEARANCE

(71) Applicant: QUALCOMM Incorporated, San Diego, CA (US)

(72) Inventor: Jagadishwara Reddy, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 408 days.

(21) Appl. No.: 14/861,203

(22) Filed: Sep. 22, 2015

(65) Prior Publication Data
US 2017/0083230 A1 Mar. 23, 2017

(51) Int. Cl.
| G06F 3/00 | (2006.01) |
| G06F 3/0488 | (2013.01) |
| G06F 3/03 | (2006.01) |
| G06K 9/00 | (2006.01) |
| G06F 3/0481 | (2013.01) |
| G06K 9/46 | (2006.01) |
| G06F 3/01 | (2006.01) |

(52) U.S. Cl.
CPC .......... *G06F 3/04886* (2013.01); *G06F 3/005* (2013.01); *G06F 3/0304* (2013.01); *G06F 3/04817* (2013.01); *G06K 9/00006* (2013.01); *G06K 9/46* (2013.01)

(58) Field of Classification Search
None
See application file for complete search history.

(56) References Cited

U.S. PATENT DOCUMENTS

| 8,120,642 B2 | 2/2012 | Jelinek et al. |
| 8,982,160 B2 | 3/2015 | Yee et al. |
| 2005/0110756 A1 | 5/2005 | Hall et al. |
| 2009/0251422 A1 | 10/2009 | Wu et al. |
| 2009/0254855 A1* | 10/2009 | Kretz ............... G06F 1/1626 715/800 |
| 2010/0231522 A1 | 9/2010 | Li |

(Continued)

FOREIGN PATENT DOCUMENTS

| EP | 2431853 A2 | 3/2012 |
| EP | 2933713 A1 | 10/2015 |
| JP | 2014092988 A | 5/2014 |

OTHER PUBLICATIONS

Anonymous: "Focal length—Wikipedia", Wikipedia, Sep. 21, 2015, NSCI 3001 Laboratory, XP055333609, 5 pages (pp. 1-5). Retrieved from the Internet: URL:https://en.wikipedia.org/w/index.php?title=Focallength&oldid=682062941.

(Continued)

*Primary Examiner* — Toan Vu
(74) *Attorney, Agent, or Firm* — The Marbury Law Group, PLLC

(57) ABSTRACT

Methods and devices are disclosed for adjusting a size of one or more keys of a soft keyboard presented on a display of a computing device. A dimension of a finger feature of a finger of a user of the computing device may be calculated from an image of the finger of the user in an image frame of a camera of the computing device based on parameters of the camera of the computing device. A size of the finger of the user may be determined based on the finger feature dimension. The size of one or more keys of the soft keyboard may be adjusted based on the determined size of the finger of the user.

17 Claims, 13 Drawing Sheets

(56) References Cited

U.S. PATENT DOCUMENTS

| | | | |
|---|---|---|---|
| 2011/0102335 A1 | 5/2011 | Miyamura et al. | |
| 2011/0320974 A1* | 12/2011 | Bai | G06F 3/016 715/773 |
| 2012/0076369 A1 | 3/2012 | Abramovich et al. | |
| 2012/0078614 A1* | 3/2012 | Galor | G06F 3/011 704/9 |
| 2012/0092304 A1* | 4/2012 | Katz | G06F 3/017 345/179 |
| 2012/0106792 A1* | 5/2012 | Kang | G06K 9/00228 382/103 |
| 2012/0218183 A1* | 8/2012 | Givon | G06F 3/017 345/157 |
| 2012/0260207 A1 | 10/2012 | Treskunov et al. | |
| 2013/0107021 A1* | 5/2013 | Maizels | G06T 19/006 348/50 |
| 2013/0155031 A1* | 6/2013 | Dahl | G06F 3/0412 345/177 |
| 2014/0006997 A1* | 1/2014 | Kim | G06F 3/0488 715/773 |
| 2014/0357312 A1 | 12/2014 | Davis et al. | |
| 2015/0054761 A1* | 2/2015 | Kim | G06F 3/04886 345/173 |
| 2015/0277760 A1* | 10/2015 | Tagaya | G06F 3/0488 715/711 |

OTHER PUBLICATIONS

Anonymous: "Image Formation by Lenses and the Eye", HyperPhysics, Aug. 23, 2015, XP055333613, 4 pages (pp. 1-4). Retrieved from the Internet: URL:http://hyperphysics.phy-astr.gsu.edu/hbase/Class/PhSciLab/imagei.html.

Elendil The Tall: "Calculations—Calculate Object Size when I have Physical Pixel Size", Photography Stack Exchange, May 23, 2012, XP055333605, 2 pages. Retrieved from the Internet:URL:http://photo.stackexchange.com/questions/23651/calculate-object-size-when-i-have-physical-pixel-size.

International Search Report and Written Opinion—PCT/US2016/044455—ISA/EPO—Jan 24, 2017.

Metzger P., et al., "Determining Real Object Dimensions from Images", ResearchGate, Sep. 6, 2011, KP055333600, 2 pages. Retrieved from the Internet: URL:https//:www.researchgate.net/post/Determiningrealobjectdimensionsfromimages.

Partial International Search Report—PCT/US2016/044455—ISA/EPO—Oct. 20, 2016.

* cited by examiner

107

159
157

155

153
151

150

| Property | Value |
|---|---|
| Horizontal resolution | 72 dpi |
| Vertical resolution | 72 dpi |
| Bit depth | 24 |
| Compression | |
| Resolution unit | 2 |
| Color representation | sRGB |
| Compressed bits/pixel | |
| Camera | |
| Camera maker | |
| Camera model | |
| F-stop | f/2.4 |
| Exposure time | 1/14 sec. |
| ISO speed | ISO-400 |
| Exposure bias | 0 step |
| Focal length | 4 mm |
| Max aperture | 2.52606 |
| Metering mode | Average |
| Subject distance | |

FIG. 1D

AUTOMATIC CUSTOMIZATION OF KEYPAD KEY APPEARANCE

BACKGROUND

Today's computing devices, such as smart phones, tablets, etc., are widely equipped with touch sensitive displays and input screens. Often, these devices are equipped with touch screens that facilitate the use of "soft keyboards" for these devices. A soft keyboard may involve the presentation, through software, of a keyboard displayed on the touch sensitive display as a number of icons linked to key values. To activate a soft key of the keyboard, the user "touches" the area of the touchscreen corresponding to the display of the key. Soft keyboards for these devices are generally presented as a fixed-size keypad of keys. These key sizes may be dependent on the size of the device and or the touchscreen on the device. Some devices may have keypad keys with a relatively large fixed size (e.g., iPads, tablets, etc.). Some devices may have keypad keys with a relatively small fixed size (e.g., smartphones, compact phones, budget phones, etc.).

Having a fixed keyboard key size may make it difficult for users with different finger sizes to use the same device model. Users with large fingers may have a different user experience interacting with a standard keyboard key size of fixed key size devices. On average, male finger sizes are bigger than female finger sizes. Thus, standard keyboard fixed key sizes may be unsuitable for at least some users based on user gender (e.g., smaller standard key size may disadvantage male users and larger standard key sizes may disadvantage female users). Also, because children are now using phones and other devices extensively, standard keyboard fixed key sizes may not be suitable for the generally smaller-sized fingers of younger users. Thus, while a standard key size and spacing may be suitable for those users who fit an average profile, many users will find the standard key sizes to be difficult to use.

SUMMARY

Various embodiments include methods and devices for implementing the methods for adjusting a size of one or more keys of a soft keyboard presented on a display of a computing device based on an image of a finger of a user. Methods implemented by a processor of a computing device according to various embodiments may include calculating a dimension of a finger feature of a finger of a user of the computing device from an image of the finger captured in an image frame of a camera of the computing device based on parameters of the camera of the computing device, determining a size of the finger of the user based on the calculated dimension of the finger feature, and adjusting the size of one or more keys of the soft keyboard based on the determined size of the finger of the user.

Some embodiments may further include searching the image frame of the camera to find the finger of the user, and identifying the finger feature in response to finding the finger of the user in the image frame. In some embodiments, calculating a dimension of a finger feature of the finger of a user of the computing device from the image of the finger captured in an image frame of a camera of the computing device based on parameters of the camera of the computing device may include calculating an object distance of the finger of the user from a lens of the camera based on at least a focal length of the camera and an image distance of the camera, and calculating the dimension of the finger feature based on at least the object distance of the finger of the user from the lens of the camera, a width of the camera sensor in pixels, a width of the finger feature in pixels, and an angle of a field of view of the camera.

In some embodiments, calculating the object distance of the finger of the user from the lens of the camera based on at least the focal length of the camera and the image distance of the camera may include focusing the camera of the computing device on the finger of the user, determining the focal length of the camera when focused on the finger, and calculating the distance from the camera to the finger based upon the determined focal length. In some embodiments, determining the size of the finger of the user based on the calculated dimension of the finger feature may include approximating the size of the finger of the user based on an outline of the finger and the calculated dimension of the finger feature.

In some embodiments, adjusting the size of one or more keys of the soft keyboard based on the determined size of the finger of the user may include comparing the determined finger size with a standard finger size, increasing the size of one or more keys of the soft keyboard when the determined size of the finger of the user is greater than a standard finger size, and decreasing the size of one or more keys of the soft keyboard when the determined size of the finger of the user is less than a standard finger size. In some embodiments, adjusting the size of one or more keys of the soft keyboard based on the determined size of the finger of the user may include generating a display overlay that prompts a user to move the finger of the user in front of the camera such that the image of the finger moves within the display overlay, and adjusting the size of one or more keys of the soft keyboard based on a movement of the finger of the user within the display overlay. In some embodiments, the finger feature may include one of a distal interphalangeal crease and a proximal interphalangeal crease.

Various embodiments include a computing device having at least a camera, a display, a memory, and a processor configured with processor-executable instructions to perform operations of the methods described above. Various embodiments include a computing device having means for performing functions of the methods described above. Various embodiments include a non-transitory processor-readable storage medium on which is stored processor-executable instructions configured to cause a processor of computing device to perform operations of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 1D is a table of camera and image characteristic data that may be used in various embodiments.

DETAILED DESCRIPTION

Figure 1A:
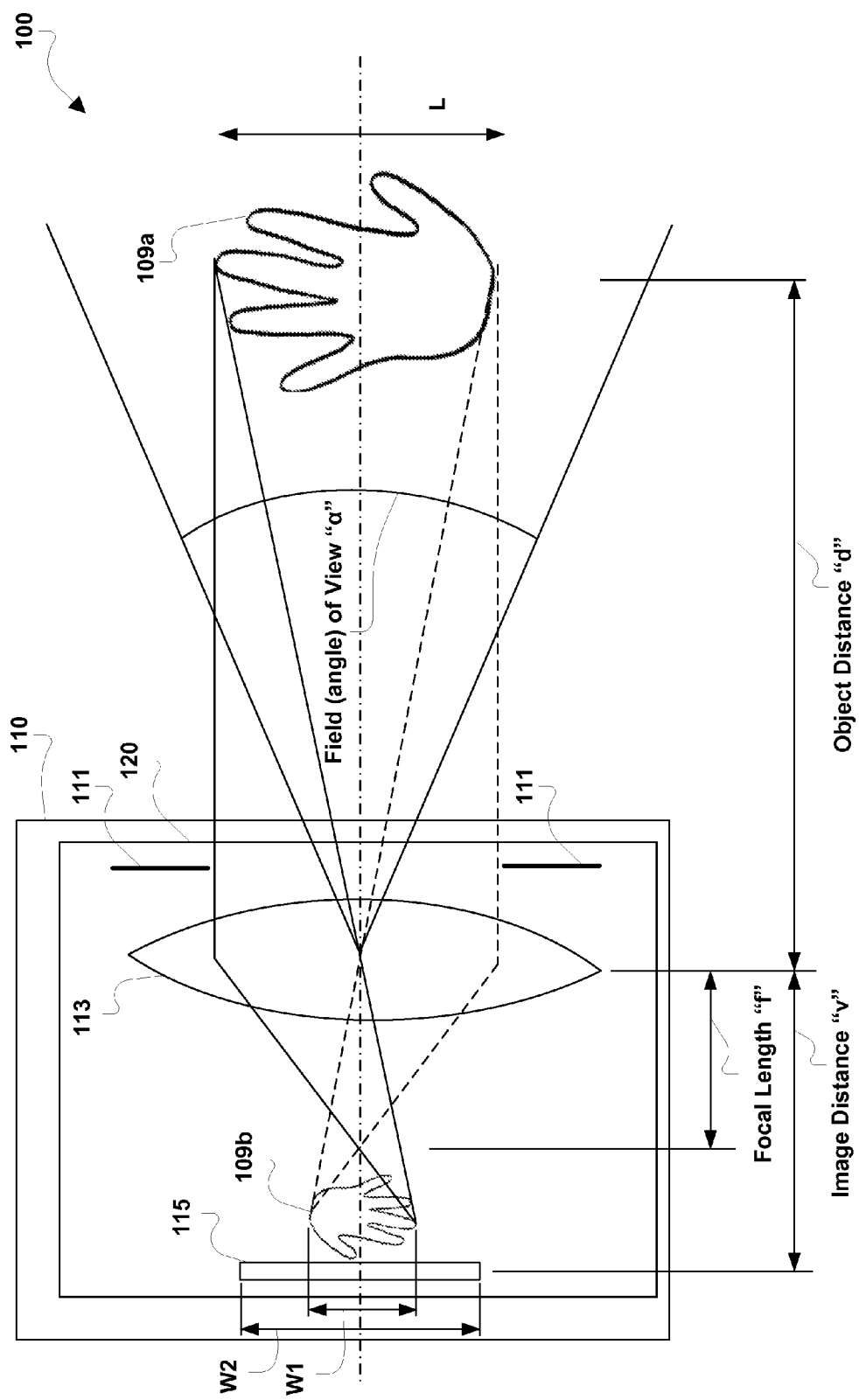
FIG. 1A is a diagram illustrating a camera imaging a hand illustrating various optical parameters and measurements that may be used in determining a size of a finger of a user according to various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments provide methods that may be implemented on a computing device, such as a mobile computing device, that facilitate adjusting soft keyboard sizes to match a finger size of a user by imaging the user's fingers. Various embodiment methods may include using a camera on the computing device used to capture an image of a finger of the user. The captured image is processed according to various embodiments to determine the size of the finger of the user based, for example, on the size of the finger within the obtained image and optical characteristics of the image. The finger size may be periodically checked to dynamically account for changes in the user of the device and/or to refine the finger size measurement. The key size (e.g., size and spacing) of the keyboard presented on the touchscreen may be adjusted based on the finger size. For example, larger soft keys may be generated for users with large fingers. In some embodiments, once a finger size is established based on capturing one or more images of the finger using the camera of the device, the finger size value may be fed into the soft keypad software/API to adjust the displayed keyboard key sizes. In some examples, the size of keys may be adjusted by a certain ratio according to the finger size of the user. In one example, the size may be adjusted to be within a minimum and maximum size range for the keys of the keyboard.

In various embodiments, a user may override an automatic key size adjustment based on the measured finger size and may select a specific key size. For example, a user with large fingers may be dexterous enough to prefer smaller key sizes and therefore may override the key size established based on the measured finger size and select a preferred key size. Such selection may be performed through a camera based adjustment or through interaction with a user interface setting (e.g., slider, dialog, etc.). While the embodiments described herein refer to adjusting the size of keys of a keyboard, in other embodiments, similar methods may be applied to adjust the size of touched enabled menus or other selection mechanisms provided on a touch screen or touch pad of a computing device. Furthermore, while example embodiments describe measuring a size of a finger, the size of the entire hand, and/or multiple distinct fingers may be calculated and used to adjust the key size.

Finger size may be calculated using the camera image based on a reference (e.g., placing the finger a fixed distance from camera). Alternatively, the finger size may be calculated using information obtained from the camera to determine the distance between the camera and the finger (e.g., a focal distance) and calculating a finger size based on the size of the finger within the obtained image. In some embodiments, an overlay may be displayed showing maximum and minimum sizes of keys, and providing a user input interface, allowing the user to self-adjust the key size by moving their finger towards and away from the camera while observing changes in the rendered key size.

In various embodiments, the calculation of the finger size may be based on a reference. In some embodiments, a standard focal length (and aperture setting) for the camera can be established (e.g., having a very small focal depth in the focal plane). The standard focal length corresponds to a focal plane at a known distance away from the camera lens. Thus, objects within the focal plane (i.e., in-focus) will be at the known distance from the camera. For example, the user may be instructed to place their finger in front of the camera and move it inward or outward until their finger is in focus. The known distance provides a reference for calculating the finger size based on the size of the finger within an obtained image. Other measurements may be used to corroborate the distance from the focal plane to the finger (e.g., ultrasound, flash strobe decay, etc.). Using the known distance as a reference, an algorithm calculates the finger width/size. For example, the known distance may enable a calculation to be made of the correspondence between the actual size/width of one image pixel and a representative size/width per pixel of the subject in the captured image. Using the calculated quantities, the algorithm may provide additional finger characteristic information (e.g., size of tip vs. overall width at widest point, finger features, etc.), which may be used to refine the key size, key shape, key spacing, or other keyboard or user interface attributes.

In some embodiments, an overlay may be provided on the camera display that shows a pair of converging lines. The widest space between the converging lines of the overlay may represent the largest key size setting, while the smallest space between the converging lines may represent the smallest key size setting. A user may place a finger in front of the camera lens and move the finger toward and away from the camera within the lines to "adjust" the image of the captured finger that leads to the measured finger size used for determining key size in order to result in a soft keyboard with keys of a size that the user wishes to use for typing. This embodiment method may provide some user flexibility, enabling a user with large or small fingers to avoid key size settings that are too large or small for their individual preference. An alternative source of reference information may allow the computing device to calculate finger size and adjust the key size according to the user's preference, which the user may express by positioning a finger within the converging lines.

FIGS. 1A through 1E illustrates examples of optical characteristics 100 that may be used to determine a size of an object (e.g., a hand/finger) by a computing device 110. By determining the size of a finger of a user through images captured through the camera at the device, the key size of a soft keyboard may be adjusted automatically. In various embodiments, the computing device 110 may be a mobile device, such as a smart phone, a tablet computer, or other device configured with a camera 120.

As illustrated in FIG. 1A, the computing device 110 may include a camera 120 that includes an aperture 111, a lens 113, and an imaging sensor such as a sensor 115. The aperture 111 may be an opening of a fixed size or may be an adjustable opening. The size of the aperture 111 (e.g., f-stop) determines the depth of field for the camera 120. The depth of field refers to the depth or "thickness" of area within an image scene in front of the lens 113 that is in sharp or acceptable focus (e.g., not blurred). The direction of the depth of field extends generally perpendicular to the plane of the sensor 115. A small diameter of the opening of the aperture 111 may result in a relatively "deep" depth of field, while a large diameter of the opening of the aperture 111 may result in a relatively "shallow" depth of field. A typical smartphone camera may have an aperture of around f/2.0 to f/2.4. Other aperture sizes are possible.

The lens 113 may be fixed or may be movable so that the focal length "f" of the camera 120 can be changed. A typical lens for a smartphone device may be made from glass, such as sapphire crystal glass or other glass. A typical lens size for a smartphone device may be the equivalent of a lens size of around 28 mm. The camera 120 may be configured with other components, such as a shutter, an adjustable aperture, etc., which have been omitted for ease of description. In some embodiments, the camera 120 may not have a shutter or an adjustable aperture.

The camera 120 may be characterized by several parameters that govern how an image of a subject is captured. The camera 120 may capture a still image 109b of a hand 109a or may have access to image frames generated over time through the sensor 115 (e.g., video frames).

The parameters of the camera 120 may include a focal length "f," which may represent the point in space where light captured through the lens 113 converges. The focal length "f" may be fixed or variable depending on whether the lens 113 is fixed or movable. An image distance "v" may represent the distance between the physical center of the lens 113 and the surface of the sensor 115 (e.g., where the hand image 109b is captured). An object distance "d" may represent the distance between the physical center of the lens 113 and the hand 109a. A field of view "a" (e.g., angle of view) may represent the angle established by the width of the sensor 115 and the maximum width of the camera field with reference to the focal center of the lens 113. A width "$w_1$" may represent the width in pixels of the hand image 109b on the sensor 115. A width "$w_2$" may represent the width in pixels of the sensor 115. Using the parameters of the camera 120, a size of the hand 109a, or parts of the hand 109a such as the finger of the hand 109a, may be calculated.

Figure 1B:
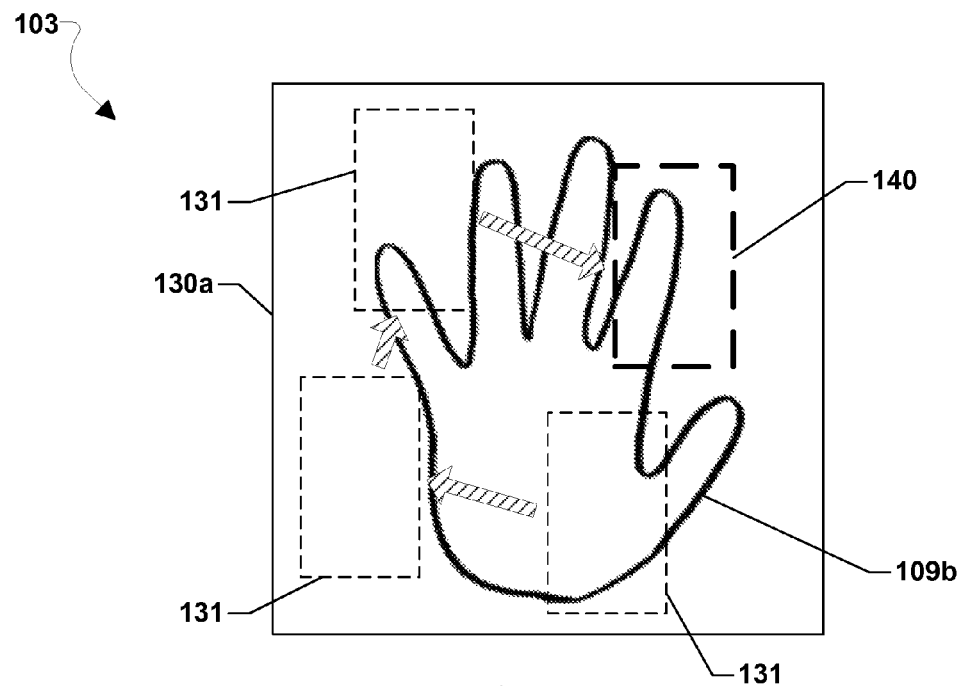
FIG. 1B is a diagram illustrating image processing operations that may be used for identifying an object within an image or image frame.

In an example 103 illustrated in FIG. 1B, the hand image 109b may be contained within an image frame 130a, such as through image capture or analysis of one or more video frames. The image frame 130a may be searched for a feature of interest, such as a finger on the hand image 109b. A search of the image frame 130a may be conducted in a number of ways. For example, with some knowledge of the approximate size of the object to be searched, a search window 131 may be established and moved throughout the image frame 130a. Patterns corresponding to a finger may be analyzed that for each position of the search window 131. Other processing operations may be performed, such as edge detection to facilitate pattern matching. Other search approaches are possible in addition to or instead of pattern matching. For example, a color tone analysis may be conducted to exclude objects that are unlikely to be a human finger (e.g., a finger is recognized if the color of the imaged object matches a limited number of skin tones, etc.). After searching the image frame using the search windows 131, a pattern may be matched and a feature of interest (e.g., the finger of the user) identified in a window 140. When the feature of interest is found in the window 140, additional processing may be conducted to facilitate determining the finger size.

In alternative or additional examples, once the user's finger is identified, the color tone of the user's finger may be used to establish aspects of the keyboard display. For example, the color tone may be used to establish a color scheme or "skin" theme for the keys. The color scheme may be based on a mapping between the detected color tone of the user's finger and a particular theme for keyboard or keypad displays. Once a user's finger and an associated color tone have been detected, the user's finger color tone may be used to identify the user from among several users of the device. The key size settings for the identified user may be set accordingly.

Figure 1C:
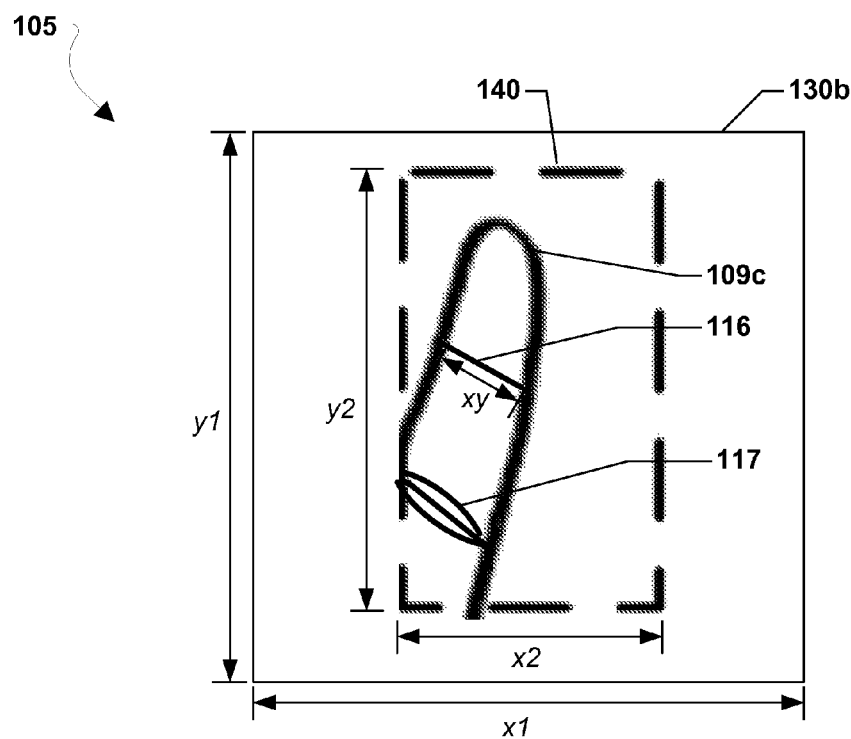
FIG. 1C is a diagram illustrating feature sizes of a finger within an image or image frame.

In an example 105 illustrated in FIG. 1C, the window 140 may contain a finger image 109c, such as an index finger. The image frame 130b may have a width dimension $x_1$ and a height dimension $y_1$. Similarly, the window 140 may have a width dimension $x_2$ and a height dimension $y_2$. The dimensions $x_1$, $x_2$, $y_1$ and $y_2$ may be used in calculations to determine the size of the finger represented by the finger image 109c.

A typical index finger may contain recognizable elements. For example, a typical index finger may contain three segments: a distal phalanx, a middle phalanx and a proximal phalanx. The distal phalanx and the middle phalanx may be separated by the distal interphalangeal crease (DIC) 116. The middle phalanx and the proximal phalanx may be separated by the proximal interphalangeal crease (PIC) 117. At least the DIC 116 and the PIC 117 may form recognizable sub-features within the window 140 that may also be identified. In various embodiments, a dimension "xy" of the DIC 116 may be determined and a finger size may be calculated based on these and other dimensions and parameters, as will be described in greater detail.

In addition to the dimensions, certain camera parameters may be obtained, which may facilitate finger size determination. In an example 107 illustrated in FIG. 1D, the camera 120 of the computing device 110 may have several parameters associated with the manufacture and/or operation. For example, such parameters may be maintained by a computing device driver for the camera 120. The parameters may be available to an application programming interface (API), such as a finger size determination and key size adjustment application. For example, a profile 150 may store parameters that are available to APIs on the computing device 110 that are specific to the camera 120. The profile 150 may include parameters such as a maximum aperture size 151, a focal length 153, an F-stop 155, a vertical resolution 157, and a horizontal resolution 159. While some parameters are shown in FIG. 1D, other parameters may be available that may facilitate finger size determination depending on the parameters and features of the specific camera in use by the computing device 110.

In various embodiments, the object distance illustrated in FIG. 1A may be calculated based on obtaining camera parameters as set forth above. For example, an object distance "d" may be obtained in accordance with EQ(1) as follows:

$$1/\text{object distance} = 1/\text{focal length} - 1/\text{image distance} \quad \text{EQ(1)}$$

As the focal length and image distance may be obtained from the camera parameters as set forth above, the object distance may be calculated through EQ(1) using the obtained parameters for the camera 120. When the object distance is calculated, the size of the object in the "x" dimension, such as the finger with reference to FIG. 1C, may be obtained in accordance with EQ(2) as follows:

$$\text{object size}(x \text{ dimension}) = ((\tan(\alpha/2)*d)*2x_2)/x_1 \quad \text{EQ(2)}$$

A similar calculation may be performed to determine the size of the object for the "y" dimension. Other dimensions, such as the "xy" dimension of the DIC 116 in FIG. 1C, may be obtained or derived from the x and y dimension size calculations through calculations based on trigonometric relations. When the dimensions are calculated, a finger size may be determined. For example, an area of the fingertip can be estimated based on the measured xy dimension of the DIC 116. In other embodiments, the DIC 116 and/or the PIC 117 may be used as reference features for identification of recognizing or identifying the finger within a captured image. Alternatively or additionally, the dimensions of the DIC 116 and/or the PIC 117 may be used to calculate or estimate size dimensions of other features of the finger such as the fingertip.

Figure 1E:
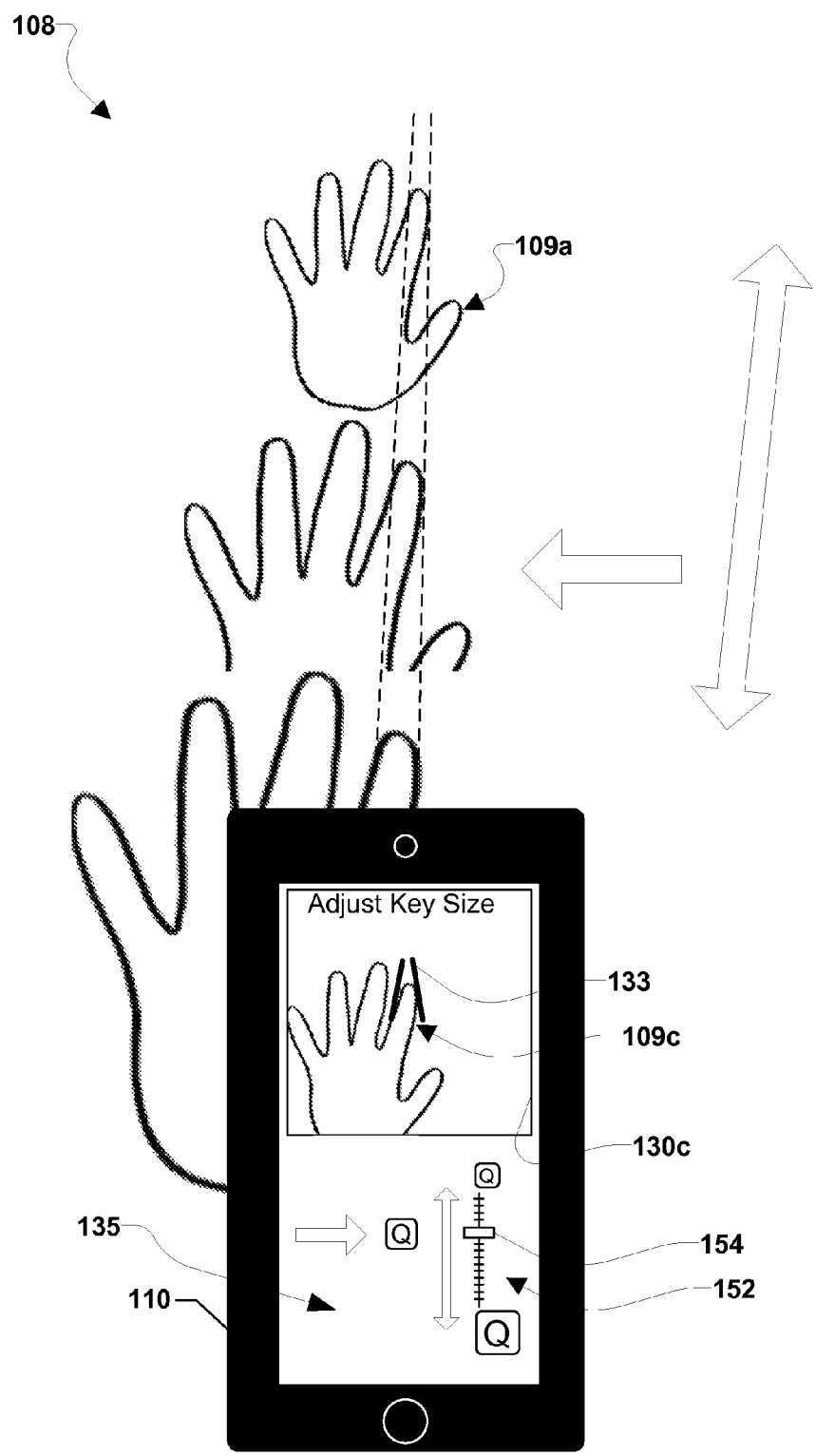
FIG. 1E is a diagram illustrating a mobile computing device determining a finger size using an image and adjusting a key size according to various embodiments.

An example 108 illustrated in FIG. 1E shows the computing device 110 using an overlay 135 in the image frame 130c according to various embodiments. The image frame 130c may be a display area for a static image or video image that may change. The overlay 135 may prompt the user to move their hand back and forth (inward and outward, toward and away, etc.) in front of the camera 120 such that the finger image 109c moves within convergent lines 133 of the overlay 135. The overlay 135 may include control areas, such as buttons or sliders as will be described. The positions and visual appearance of the controls may change as the finger size is adjusted. The overlay 135 may further include the image frame 130c. The distance between the convergent lines 133 of the overlay 135 may represent a minimum and maximum key size. By moving the hand 109a inward and outward in front of the camera 120 the finger image 109c moves within the convergent lines 133 to provide a visual indicator of the relative position of the current key size setting within the minimum and maximum settings. As the finger image 109c is moved within the convergent lines 133, the overlay 135 may provide a dynamic display of the current key size based on the movement. The overlay 135 may also have an adjustment area 152 that both displays the current key size setting invoked by the movement of the hand 109a and provides for a manual adjustment such as through a slider 154. A user may interact directly with the slider 154. Such an adjustment may be useful once a user knows the correct key size setting for their finger size or their key size preference.

The adjustment of key size based on finger size determination may be useful to establish a key size for one or more keys of a soft keyboard as illustrated in FIGS. 2A-2D. Although not illustrated, the adjustment of key size may take into account that some keyboards may have letters, numbers, or other characters or input or keys that include multiple characters together on the same key that may provide for different size keys (e.g., character dependent). In a text entry example 200 illustrated in FIG. 2A, the computing device 110 may provide a touch screen display 125 for displaying various display and user interface elements such as a soft keyboard 210. The computing device 110 may be configured with an application, such as an email application that may provide a text entry screen 127 for text entry into the body of an email. The soft keyboard 210 may be configured with keys that may be present in a standard keyboard such as a "QWERTY" keyboard. In the illustrated example 200, the keys of the soft keyboard 210 are of a "standard" size. By "standard size" reference is made to a default size of the keys. For example, the default size of the keys may be based on ergonomic studies resulting in a "standard" finger size. Alternatively, the default size of the keys may be set to an average size or a midpoint size between the minimum or the maximum possible sizes. In other words, the default key size setting does not take into account the finger size of the user of the computing device 110.

Figure 2A:
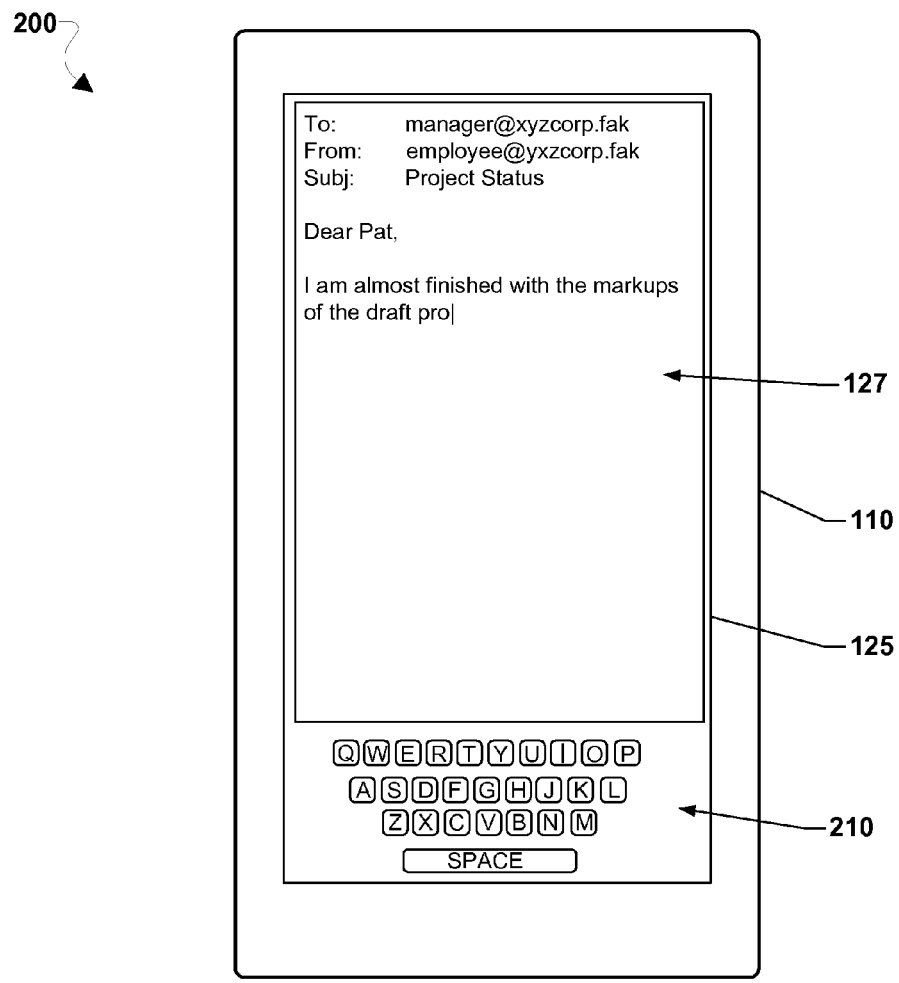
FIG. 2A is a diagram illustrating a mobile computing device and a soft keyboard having keys of the standard size.
Figure 2B:
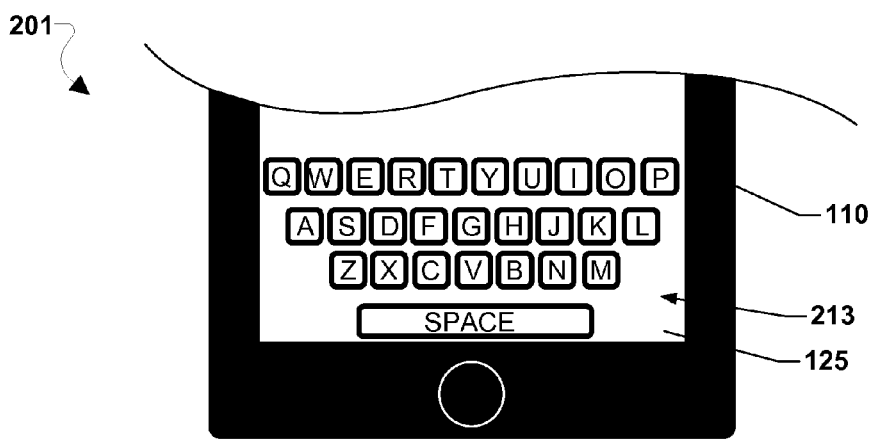
FIG. 2B is a diagram illustrating a mobile computing device and a soft keyboard having keys of a larger size.

In an example 201 illustrated in FIG. 2B, the computing device 110 may conduct measurements and calculations to determine a finger size as described herein. When the finger size is determined, the computing device 110 may determine an adjustment to the key size of the soft keyboard 210. For example, the computing device 110 may determine that the finger size of the user is relatively large. In various embodiments, in response to the finger size measurement, the computing device 110 may adjust the original size of the soft keyboard 210 to a large size soft keyboard 213. In various embodiments, the size of all of the keys of the large size soft keyboard 213 may be increased. The increase in overall size of the large size soft keyboard 213 may be constrained by the space available of the touch screen display 125.

Figure 2C:
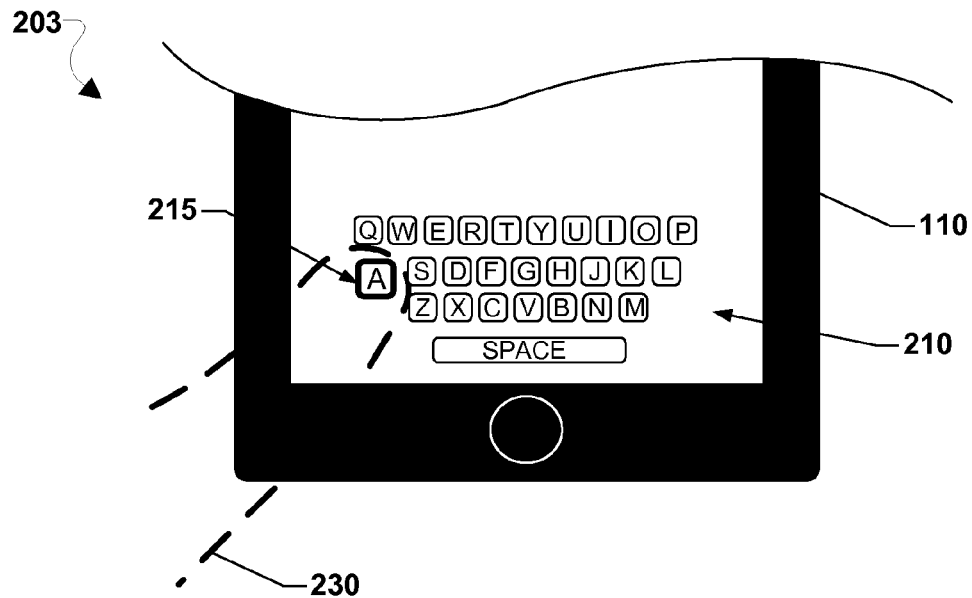
FIG. 2C is a diagram illustrating a mobile computing device and a soft keyboard including a key with an increased key size.

In an example 203 illustrated in FIG. 2C, the size of an individual key 215 may be increased based on a detected position of the finger 230. For example, the finger 230 may be determined to be over the individual key 215, such as the key "A." The finger 230 may move over another key, in response to which the size of the key would be increased. The position of the finger 230 may be determined by a variety of methods, including capacitive detection, optical detecting, etc. For example, when the finger 230 comes close to or touches the surface of the touch screen display 125, the position of the finger 230 relative to the closest key may be determined and the closest key size may be increased.

Figure 2D:
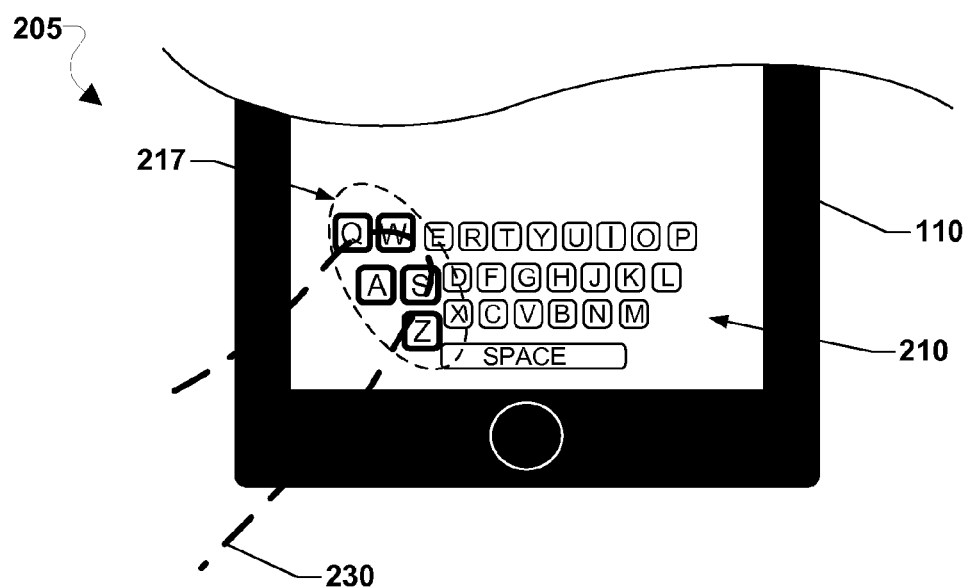
FIG. 2D is a diagram illustrating a mobile computing device and a soft keyboard including a group of keys with an increased key size.

In another example 205 illustrated in FIG. 2D, the size of a group of keys 217 may be increased based on a detected position of the finger 230 relative to the group of keys or region of the soft keyboard 210. For example, the finger 230 may be determined to be over the group of keys 217, such as the keys "Q," "W," "A," "S" and "Z." The finger 230 may move over other keys, in response to which the size of those keys would be increased. The position of the finger 230 relative to the region of the soft keyboard 210 may be determined by a variety of methods, including sensing changes in a local electric field by capacitive sensors, imaging the finger with an optical sensor, etc. For example, when the finger 230 comes close to or touches the surface of the touch screen display 125, the position of the finger 230 relative to the closest group of keys may be determined and the size of the group of keys may be increased.

In various embodiments, a correspondence between the adjustment size of the keys and the determined finger size may be developed. In some embodiments, the finger size may be measured against a standard finger size threshold and the key size may be increased or decreased accordingly. For example, ranges of finger sizes (e.g., both larger and smaller) relative to the standard or average finger size may be established based on ergonomic data. The key size adjustment may be scaled accordingly. For example, the maximum key size may result from a determined finger size falling at the end of the large range relative to the average finger size. Similarly, the minimum key size may result from a determined finger size falling at the end of the small range relative to the average finger size. Alternatively or additionally, large and small finger size thresholds may be established. In other words, finger sizes at or larger than the large size threshold may result in the maximum key size setting and finger sizes at or smaller than the small size threshold may result in the minimum key size setting.

Figure 3A:
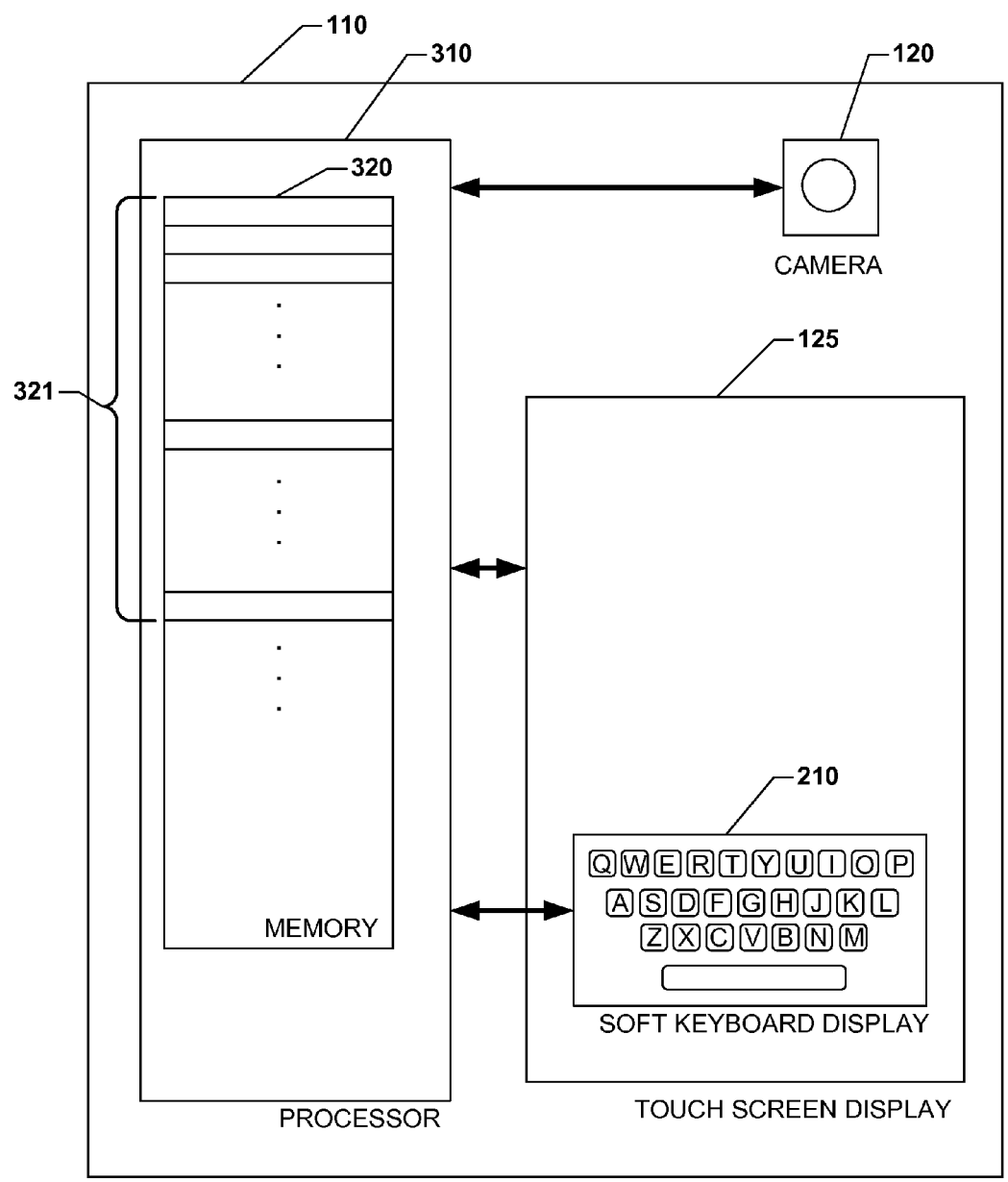
FIG. 3A is a hardware block diagram of an example mobile computing device suitable for use with various embodiments.
Figure 3B:
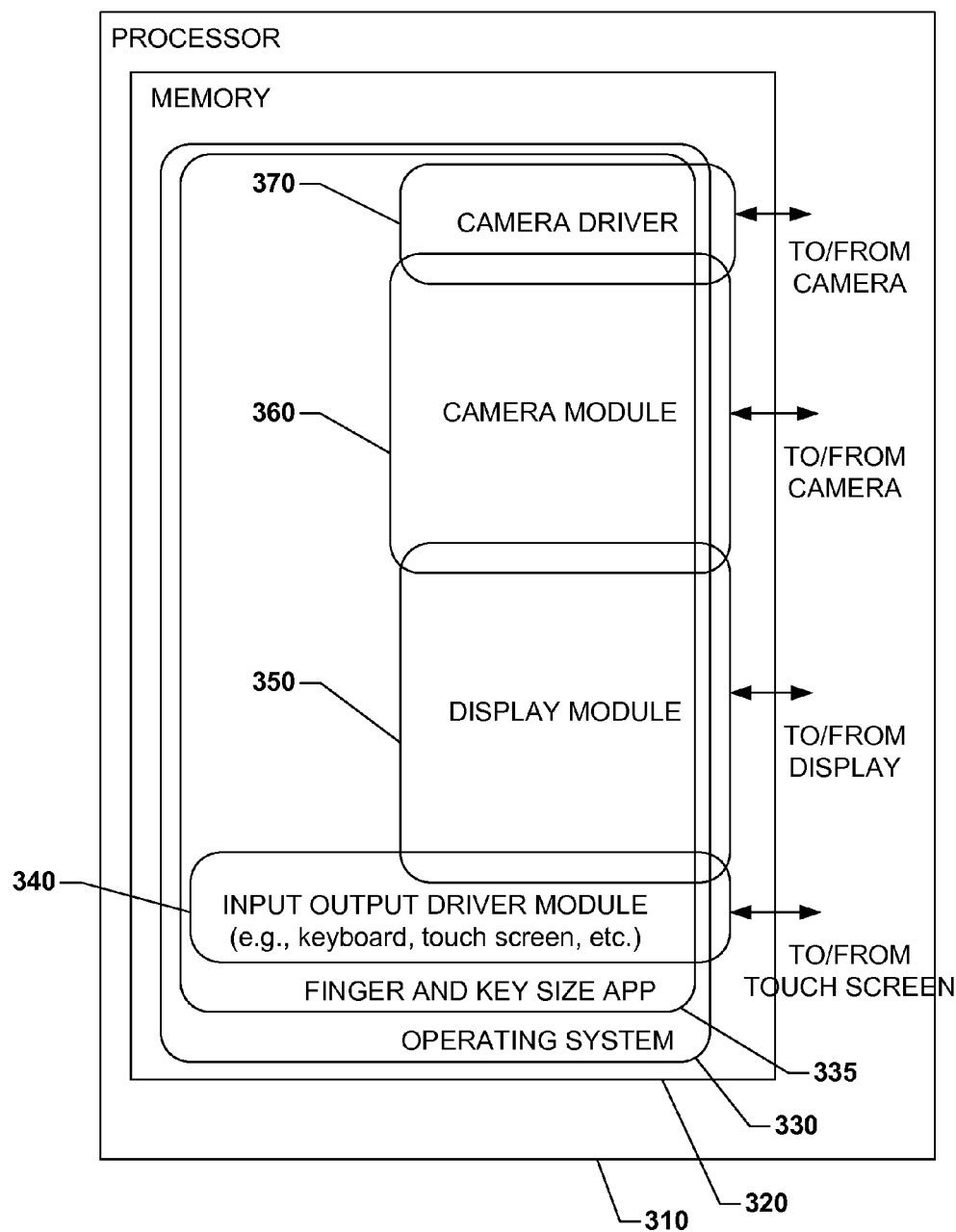
FIG. 3B is a functional block diagram illustrating logical components of a mobile computing device suitable for use with various embodiments.

In various embodiments illustrated in FIGS. 3A-3B, the computing device (e.g., computing device 110 in FIGS. 1A-1E, and FIGS. 2A-2D) may include hardware and software components that facilitate the determination of a user finger size and adjustment of key sizes in a soft keyboard display.

With reference to FIG. 3A, the computing device 110 may include a processor 310 and a memory 320, which may be coupled to the camera 120, the touch screen display 125 including the display of the soft keyboard 210. The processor 310 may perform operations based on instructions 321 that may be stored in the memory 320. While shown as being associated with the processor 310, the memory 320 may also include external volatile and non-volatile memory and/or secondary storage that stores instructions, data, etc. The instructions 321 may configure the processor 310 to perform various operations including providing display data to the touch screen display 125. The display data may include camera image data, application oriented display data, dialog display data, and other data associated with display and/or rendering on the display. The display data may be stored and retrieved from other parts of the memory 320, other memory (not shown), or a secondary storage device (not shown). In addition, the instructions may configure the processor 310 to receive data from the touch screen display 125. For example, in various embodiments, the touch screen display 125 may be a touch sensitive display whereby input data associated with a user interaction with the touch screen display 125 may be received by the processor 310. Other attributes of the display such as color resolution, display type (LCD, LED, etc.) are omitted for ease of description. In some embodiments, the processor 310 may accomplish display interactions with the touch screen display 125 through a dedicated display processor (not shown).

The processor 310 may be further configured, such as by the instructions 321, to provide data to the touch screen display 125 that includes keyboard data associated with the soft keyboard 210. The keyboard data provided by the processor 310 for the display of the soft keyboard 210 may include key size, key placement (e.g., position), key color/shading, key active status, key mapping, and other key specific data that enables the soft keyboard 210 to be properly rendered. The key mapping data may include data that maps touch positions associated with the touch screen display 125 to specific keys of the soft keyboard 210. The processor 310 may also be configured to receive data from the touch screen display 125. More specifically, interactions between the user's finger and the touch screen display 125 may cause key touch data to be received by the processor 310 from the touch screen display 125. The key touch data may provide information associated with a location of a touch such that the processor 310 may determine which key has been activated, such as through the key mapping data. While various operations of the processor 310 are described with reference to providing and receiving data associated with the soft keyboard 210, the processor 310 may perform or may be performing other operations, which are omitted for ease of description.

With reference to FIG. 3B, the operations performed by the processor 310 in various embodiments may be based on the instructions 321, which may be associated with various software routines that are loaded in the memory 320 and/or an external memory device (not shown) such as a secondary memory. In some instances, at least some of the software routines may have components, such as operating system components, driver components, etc., that are integrated into the hardware of the computing device 110. For example, such software routines may be incorporated into devices, aside from the memory 320, such as in a dedicated read-only memory area (ROM), programmable logic device, or other device where the functions are not likely to be subject to change in the short term.

In various embodiments, the processor 310 may be configured with an operating system 330, which may govern most or all of the operating aspects of the computing device 110 starting from power-up (and possibly before power-up) to final shut-down. The operating system 330 may control the access by software applications or programs to processor and system resources. The operating system 330 may facilitate the transfer of data between devices such as the processor 310, the touch screen display 125, the camera 120, or other modules and routines. The operating system 330 may manage system interrupts that alert the processor 310 to the occurrence of real-time events (e.g., a key stroke). While a simplified description of the operating system 330 is provided, numerous details of the operating system 330 are omitted for ease of description.

The operating system 330 may support the execution and interoperation of various applications on the processor 310. In various embodiments, the operating system may support the execution of a finger size determination and key size adjustment application such as a finger and key size application 335. The finger and key size application 335 may facilitate the determination of the finger size of the user's finger and use the determined finger size to adjust the size of one or more keys of the soft keyboard 210 as described herein. The finger and key size application 335 may interoperate with various other applications and services supported by the operating system 330. For example, one or more input/output drivers 340 may be executing on the processor 310. The one or more input/output drivers, which may be implemented in an input/output module 340, may provide data to and receive data from the application 335. For example, the data provided to the application 335 may be data that has been input to or generated by the component of the computing device 110 for which the input/output driver module 340 is responsible. Similarly, the data received from the application 335 may be data that is to be output by the component of the computing device 110 for which the input output driver module 340 is responsible.

The operation of the input/output driver module 340 may be supported by the operating system 330. Various events for which the input output driver module 340 may be responsible, such as the touching of the touch screen display 125, may be detected and passed to other applications where the events may be processed as inputs. For example, the user touching the touch screen display 125 may generate an interrupt to which the input/output driver module 340 may respond. The input/output driver module 340 may collect additional information from the touch screen display 125, such as the location in screen coordinates of the touch on the touch screen display, the duration of the touch, the interval between successive touches, etc. The input/output driver 340 may communicate the relevant information to the application 335, which may process the location of the touch. When system events require the update of a parameter associated with the component for which the input/output driver module 340 is responsible, such as an update to the size of a key of the soft keyboard 210, the input/output driver 340 may receive the data and assert the data in connection with the computing device for which the input/output driver is responsible.

In some embodiments, the input/output driver module 340 may work in connection with other modules such as the display module 350 and the application 335. For example, the display module 350 may be responsible for the display of the soft keyboard 210, including the rendering of keys of an increased key size, a reduced key size or a standard key size. When an input received from the input/output driver module 340 indicates that a soft key has been pressed, some degree of visual feedback may be stimulated directly or indirectly through a communication, function call, or other interprocess communication mechanism from the input/output driver module 340 to the display module 350. In addition, the application 335 may recognize that the size of one or more of the keys of the soft keyboard 210 may require an adjustment, such as based on a calculated finger size. In response, the application 335 may communicate with the display module 350, through an inter-application or inter-process communication mechanism facilitated by the operating system 330. For example, the application 335 may communicate directly or indirectly with the display module 350 to change the size of the relevant key or keys rendered by the display module 350.

In various embodiments, a camera module 360 and a camera driver 370 may facilitate the control of the camera 120. For example, the camera driver 370 may be used to control the settings of the camera and communicate various camera parameters currently active in the camera 120. For example, the camera driver 370 may populate the screen 150 shown in FIG. 1D. Alternatively, the camera driver 370 may populate a data structure containing elements for maintaining camera parameters that may be passed to and from the camera driver 370 (e.g., to and from the application 335) through functions, methods, or other mechanisms. For example, the application 335 may query the camera driver 370 (such as through an operating system-facilitated function or service call) by passing a data structure with elements, such as those corresponding to the screen 150. The application 335 may pass the data structure to the camera driver 370 along with the query and receive a populated data structure in response to the query (or an address/pointer to where the populated data structure may be located). In other embodiments, the camera parameters may be made available in a series of memory locations or addresses, which are passed to the application 335. The application 335 may access the camera parameters and use that information to perform various calculations related to determining finger size.

In some embodiments, one or more of the various modules, including for example the input/output driver module 340, the display module 350, the camera module 360, and the camera driver 370, may be implemented within the application 335 and feed data to the operating system 330, while in other embodiments various modules of the operating system 330 may be accessed by the application 335. To illustrate this, FIG. 3B shows the input/output driver module 340, the display module 350, the camera module 360, and the camera driver 370 spanning both the finger and key size application 335 and the operating system 330.

Figure 4A:
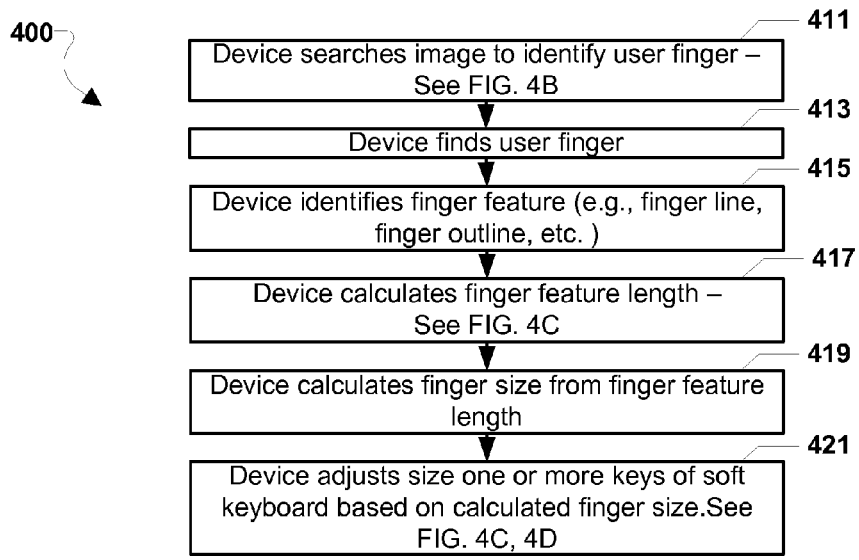
FIG. 4A is a process flow diagram illustrating a method for determining finger size using a camera and adjusting a key size according to various embodiments.

In various embodiments, the computing device 110 (e.g., computing device 110 in FIGS. 1A-1E, FIGS. 2A-2D, and FIGS. 3A-3B) may perform various methods illustrated in FIGS. 4A-EB, such as under control of the processor 310, to determine a finger size and adjust of key sizes in a displayed soft keypad.

FIG. 4A illustrates a method 400 for calculating a finger size of a user of a computing device such that key size adjustments may be made according to various embodiments.

In block 411, the processor of the computing device 110 may search an image frame (e.g., image frame 130a, 130b, or 130c) to identify a finger of the user. Searching for a finger within the image frame is described in greater detail with reference to FIG. 4B. In block 413, the processor may find a match between the pattern in the search window and a pattern appearing in the image frame. The matching pattern may be captured or isolated in a "found" window (e.g., window 140). In block 415, the processor of the computing device 110 may identify a feature in the finger image. For example, in various embodiments, the feature may be a finger crease, such as the distal interpalangeal crease (e.g., DIC 116).

In block 417, the processor of the computing device 110 may calculate a size of the identified finger features. For example, the processor may calculate a length of the distal interphalangeal crease based on obtaining camera parameters and calculating a factor such as and object size for the finger. The processor may use the expressions in EQ(1) and EQ(2) as described above. Further details of feature size calculation are shown and described with reference to FIG. 4C.

In block 419, the processor may calculate the finger size from the feature length calculated in block 417. For example, the processor may perform various calculations to determine the dimensions of the fingertip of the user's finger based on the calculated length of the identified feature. The processor may calculate a perpendicular dimension between the identified feature and the fingertip and perform approximations of the fingertip size based on the calculated feature length and the calculated feature-to-fingertip dimension. Alternatively or additionally, the processor may estimate the fingertip size by performing an area approximation of the fingertip using the calculated feature length. In some embodiments, the processor may attempt to identify a width of the fingertip and calculate a size of the width dimension using EQ(1) and EQ(2). In some embodiments, the finger size may be stored along with the correspondence between the finger size and the calculated feature length for particular users. Thereafter, the processor may calculate the feature size and reference a table that stores correspondences between the user, the user's finger size, and the calculated feature length. Other approaches for determining a measure of the user's fingers are also possible.

In block 421, the processor may adjust the size of one or more keys of the soft keyboard (e.g., 210) based on the calculated finger size. For example, the processor may determine the position of the calculated finger size within a range of finger sizes from small to large. The processor may scale the key size based on a range of key sizes from smallest to largest based on the corresponding position of the finger size within the finger size range.

Figure 4B:
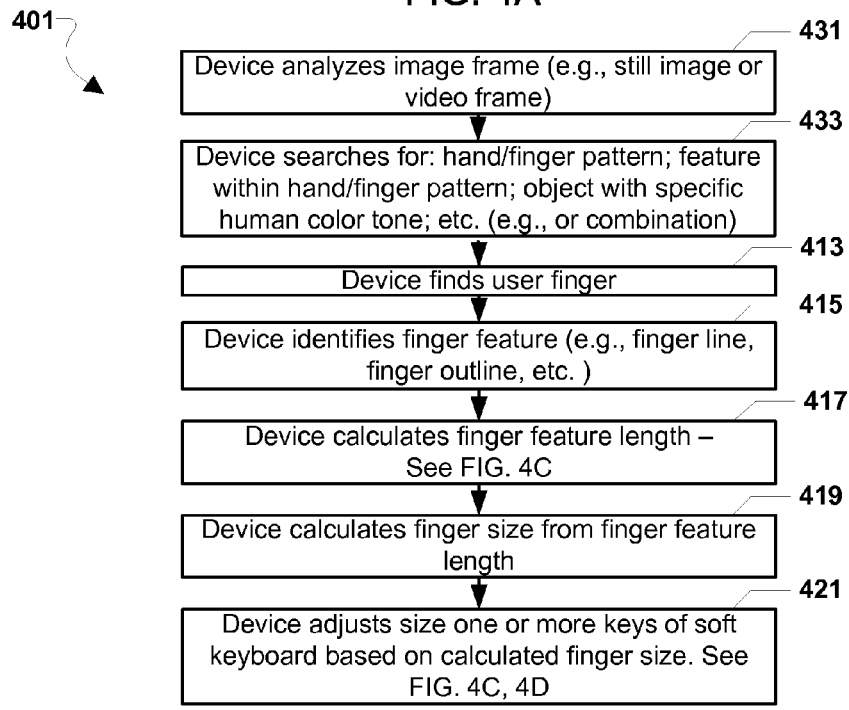
FIG. 4B is a process flow diagram illustrating a method for analyzing an image frame to search for a finger pattern according to various embodiments.

FIG. 4B illustrates an alternative method 401 for calculating a finger size of a user of a computing device. In block 431, the processor of the computing device 110 may analyze an image frame (e.g., image frame 130a, 130b, or 130c). The image frame may be a still image, a video frame, or a frame in which a video stream is being rendered such that the stream is being dynamically analyzed.

In block 433, the processor of the computing device 110 searches for a hand/finger pattern, a feature within hand/finger pattern, an object (e.g., hand/finger) with specific human color tone, or a combination of patterns. For example, the processor may establish a pattern matching search window (e.g., search window 131) that may be moved throughout the image frame in order to compare an expected pattern, such as a finger pattern, with the patterns appearing in the image frame. The patterns in the image may be enhanced through transformations such as edge detection and enhancement. The pattern may include a finger shape pattern. Alternatively or additionally, the pattern may include an area having a specific color tone that matches a user's color tone. The descriptions of the operations performed in blocks 413 to 421 are the same as described above and are omitted for brevity.

Figure 4C:
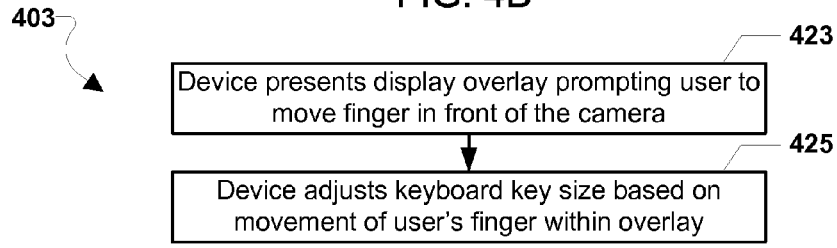
FIG. 4C is a process flow diagram illustrating a method for adjusting a key size using an overlay on a camera display according to various embodiments.

FIG. 4C illustrates an alternative method 403 for determining a finger size of a user of a computing device and adjusting one or more key sizes (see FIG. 1E). In block 423, the processor of the computing device 110 may present an overlay on the display (e.g., 125). The overlay prompts the user to move their finger toward and away from the camera, such as within convergent lines of the overlay. The extent of the convergent lines represents a minimum and maximum key size of the soft keyboard.

In block 425, the processor may adjust the key size based on the movement of the user's finger in front of the camera. Thus, as the user moves a finger back and forth in front of the camera (e.g., within the convergent lines), the key size presented on the soft keyboard will increase and decrease accordingly. The user can observe the changes in key sizes while repositioning the finger, and take an action to select or fix a particular key size. The action by the user to indicate that the key size should be fixed at a currently displayed size may include stopping movement of the finger (e.g., holding the finger still for a period of time), touching a confirmation button in the overlay window by another finger, or speaking an audible command. Alternatively, as illustrated in FIG. 1E, the processor may display on the overlay window a manual adjustment option, such as a slider that enables the user to provide a manual input that the processor interprets to adjust or refine the key size presented on the soft keyboard.

Figure 4D:
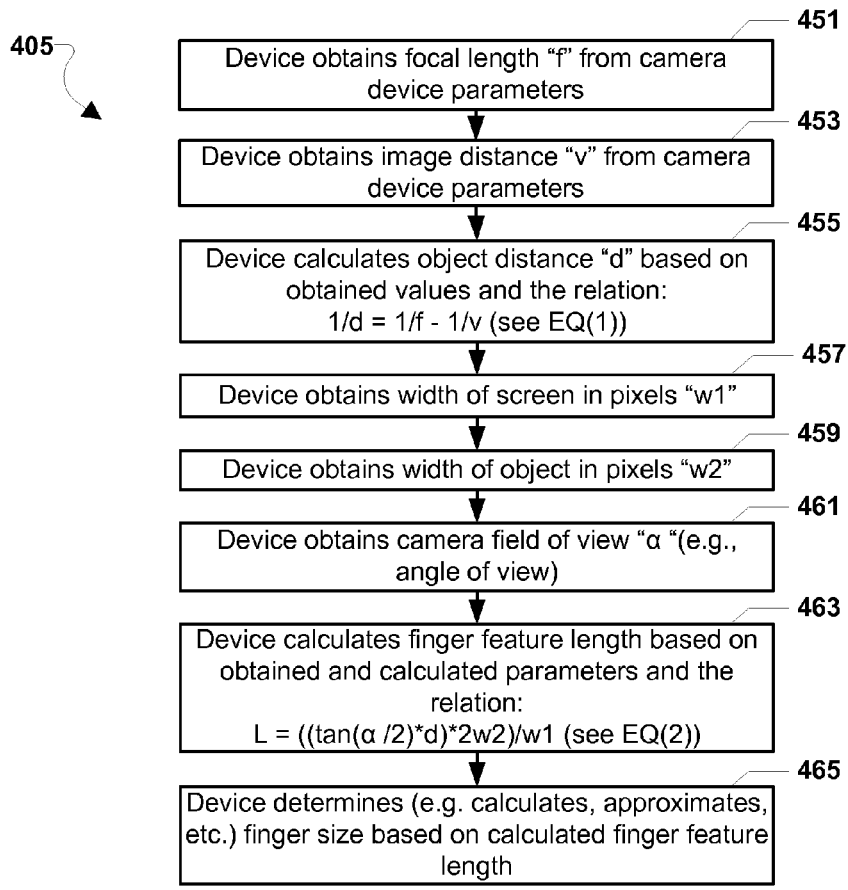
FIG. 4D is a process flow diagram illustrating a method for determining finger size using parameters of a camera according to various embodiments.

FIG. 4D illustrates a method 405 for calculating a finger size of a user of a computing device based on various camera parameters and adjusting one or more key sizes (see FIGS. 1A-1D). In block 451, the processor of the computing device 110 may obtain a focal length "f" from the camera device parameters (e.g., device driver parameters, see FIG. 1A and FIG. 1D). Depending on the camera type, the focal length may be fixed or variable depending on whether the lens of the computing device is fixed or movable.

In block 453, the processor of the computing device 110 may obtain an image distance "v" from the camera device parameters. The image distance "v" may refer to the distance between the lens and the sensor and may be available from the computing device driver or parameter data maintained in the computing device (see FIG. 1A and FIG. 1D).

In block 455, the processor of the computing device 110 may calculate the object distance "d" based on the values obtained in blocks 451 and 453 and the expression set forth in EQ(1). For example, the processor may obtain a difference of the inverse of the focal length and the inverse of the image distance. The resulting difference may represent the inverse of the object distance. Thus, the processor may invert the resulting difference to obtain the object distance.

In block 457, the processor of the computing device 110 may obtain the width "w1" of the image in pixels. For example, the processor may obtain the width of the image sensor within the maximum field of the camera of the computing device 110.

In block 459, the processor of the computing device 110 may obtain the width "w2" of the object in pixels. For example, the processor may have recognized the object after a search of an image frame in which the object (e.g., finger) appears. Thus, the processor may "count" or otherwise determine the number of pixels comprising the object width in the image.

In block 461, the processor of the computing device 110 may obtain a camera field of view "α" (angle of view). For example, the angle of view parameter may be established based on the lens and the sensor size of the computing device 110.

In block 463, the processor of the computing device 110 may calculate an object size, such as the finger feature length (e.g., the length of the DIC 116) based on the obtained and calculated parameters. For example, the processor of the computing device may calculate the finger feature length using the parameters obtained in blocks 457, 459, and 461 and based on the object distance calculated in block 455 and the expression set forth in EQ(2).

In block 465, the processor of the computing device 110 may determine, such as through calculation, approximation, estimation, etc. the size of the user's finger based on the calculated finger feature length. In some embodiments, the processor may use the calculated finger feature length to look up a finger size value, such as a fingertip size, based on previously stored values. In some embodiments, the processor may estimate the fingertip area using sectional approximations based on the calculated feature length. In some embodiments, the processor may calculate a perpendicular distance from the finger feature to the tip of the finger and estimate the fingertip area using the calculated finger feature length and the calculated feature to tip dimension. In some embodiments, combinations of methods may be used.

Figure 4E:
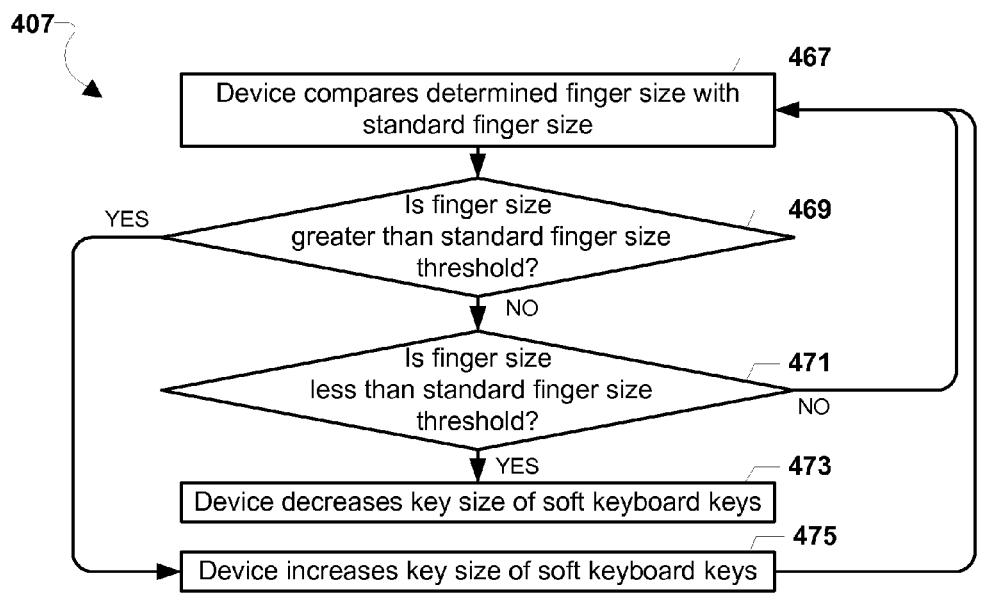
FIG. 4E is a process flow diagram illustrating a method for adjusting key size of a soft keyboard using finger size according to various embodiments.

FIG. 4E illustrates a method 407 for determining a size adjustment of one or more keys of a soft keyboard based on a calculated finger size of a user of a computing device based on a reference or standard key size.

In block 467, the processor of the computing device 110 may compare the determined finger size, (e.g., blocks 419, 465) to a standard finger size. The standard finger size may correspond to the default key size setting for the soft keyboard.

In determination block 469, the processor may determine whether the finger size is larger than the standard finger size based on the comparison. In response to determining that the finger size is larger than the standard finger size threshold (i.e., determination block 469="Yes"), the processor of the computing device may increase the size of one or more keys of the soft keyboard. For example, the processor may increase the key size from the standard key size by a factor that corresponds to the degree to which the finger size is larger (e.g., a ratio or percentage) than the standard finger size (up to a maximum key size).

In response to determining that the finger size is not larger than the standard finger size threshold (i.e., determination block 469="No"), the processor may determine whether the finger size is smaller than the standard finger size in determination block 471. In response to determining that the finger size is not smaller than the standard finger size (i.e., determination block 471="No"), the processor of the computing device may continue to compare the determined and standard finger sizes in block 467. In response to determining that the finger size is smaller than the standard finger size (i.e., determination block 471="Yes"), the processor of the computing device may decrease the size of one or more keys of the soft keyboard. For example, the processor may decrease the key size by a factor that corresponds to the degree to which the finger size is less than the standard key size (up to a minimum key size).

Figure 4F:
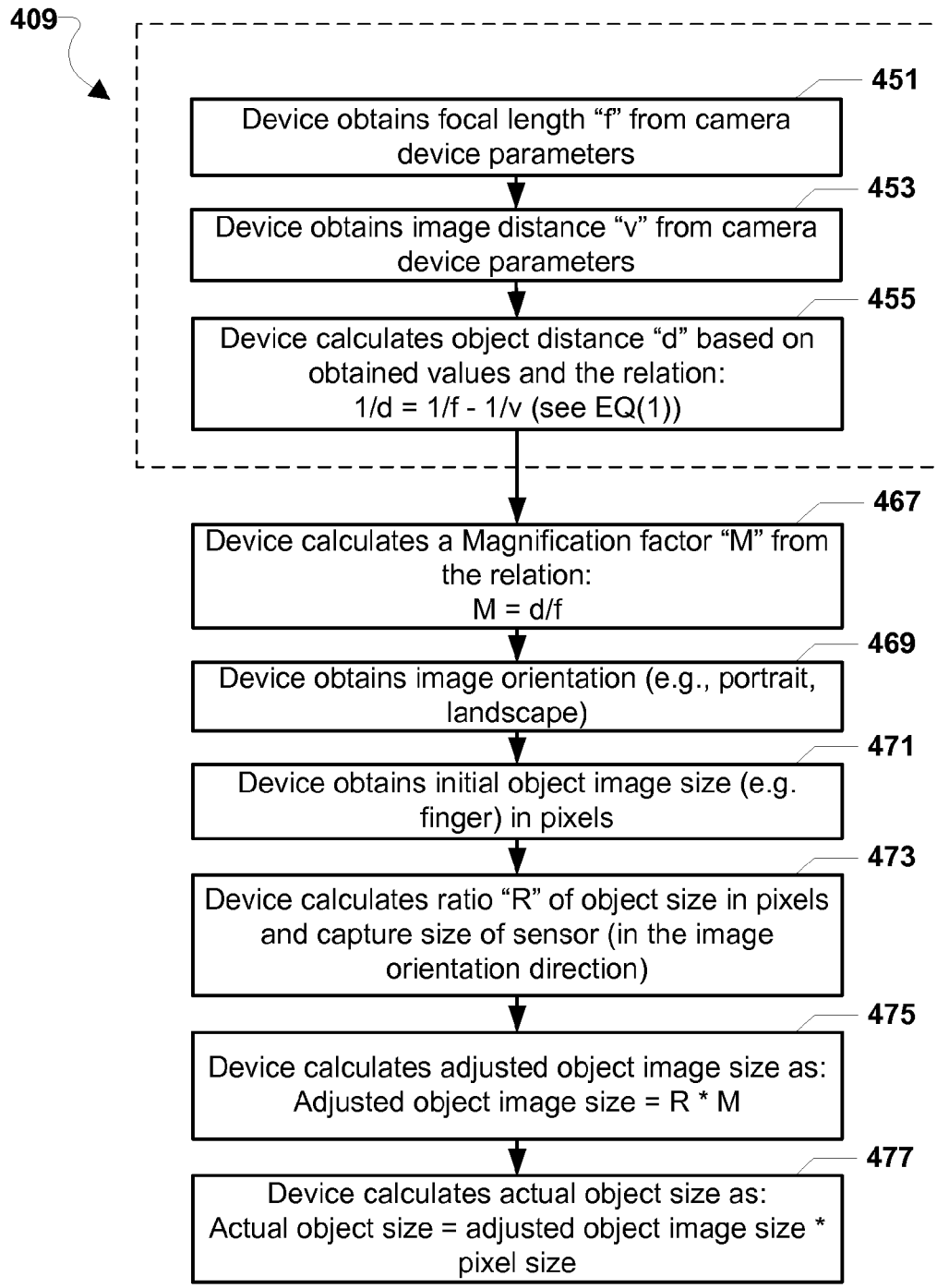
FIG. 4F is a process flow diagram illustrating a method for adjusting key size of a soft keyboard using a magnification factor according to various embodiments.

FIG. 4F illustrates a method 409 for calculating a finger size of a user of a computing device based on various camera parameters including a magnification factor and adjusting one or more key sizes (see FIGS. 1A-1E). In blocks 451, 453, and 455, the processor of the computing device 110 may obtain a parameters such as the focal length "f," the image distance "v" from the camera device parameters (e.g., device driver parameters, see FIG. 1A and FIG. 1D) and may calculate the object distance "d" from the obtained parameters and EQ(1) as described with reference to like numbered blocks in the method 405 illustrated in FIG. 4D. A detailed description of blocks 451, 453, and 455 will therefore be omitted for brevity and ease of description.

In block 467, the processor of the computing device 110 may calculate a magnification factor "M" based on the relation: $M=d/f$. For example, when the parameter f is obtained and the parameter d is calculated, such as in blocks 451, 453 and 455, the values may be used by the processor to perform a calculation of the magnification factor M.

In block 469, the processor of the computing device 110 may obtain an orientation of the image with respect to the object (e.g., finger). For example, the processor of the computing device may determine an orientation direction of the object within the image with respect to the dimension that is to be determined. In some embodiments, the length of the sensor along a first axis (e.g., a landscape axis) may be relatively longer than the length of the sensor along a second axis (e.g., a portrait axis) of the sensor.

In some cases, the finger may be extending (e.g., "pointing") along the first axis of the sensor. In such cases, the desired dimension, e.g., the fingertip width, may extend in the direction of the second axis. In some cases, the orientation may be reversed, e.g., the finger may be extending or pointing along the second axis of the sensor and the desired finger width dimension may extend in the direction of the first axis. In some c, the finger may be pointing diagonally, in which case the fingertip width may be derived from either orientation based on the angle of orientation.

In block 471, the processor of the computing device 110 may obtain an initial object size in pixels. For example, the processor may determine the feature of the finger to measure, such as through pattern matching. With the orientation of the object determined in block 469, the processor may determine a number of pixels that the object is occupying within the capture frame of the image sensor in block 471.

In block 473, the processor of the computing device 110 may calculate a ratio "R" of the capture size of the sensor in pixels and the object size in pixels. The processor may analyze pixel data to determine the boundaries of the object. The processor may "count" the number of pixels in a desired dimension direction based on the determined orientation of the object within the image and the total size of the capture area of the sensor, which may be assumed to be the same size as the sensor.

In block 475, the processor of the computing device 110 may calculate an adjusted object image size in pixels from the ratio R (i.e., calculated in block 473) and the magnification factor M (i.e., calculated in block 467) according to the relation: adjusted object image size=$R*M$. For example, the adjusted object image size may take into account factors associated with the distance of the actual object from the camera sensor, lens, etc., that may affect the accuracy of the size determination based on pixels.

In block 477, the processor of the computing device 110 may calculate an actual object size based on the adjusted object image size calculated in block 475, and the pixel size, which may be known from the device parameters. For example, the actual object size may be calculated based on the relation: actual object size=adjusted object image size*pixel size. Because the adjusted object image size is in pixels, a dimension of the actual object is obtained by multiplying the number of pixels by a pixel size.

By way of example, a camera having a sensor that has 3504×2336 pixels and corresponding dimensions of 28.7 mm×19.1 mm will have approximately 8.2 microns per pixel in both the horizontal and vertical directions of the sensor. Using an example focal length of 38 mm and an example object distance of 3000 mm in such a camera, the magnification factor may be calculated as M=3000 mm/38 mm=78.9. An example initial object image size in pixels may be 83 pixels. Thus, in this example, the value of the ratio R may be calculated as 2336 pixels capture size/83 pixels object size (e.g., approximately 28.1). The adjusted object image size may therefore be calculated as R*M=78.9*28.1=2217.09. The actual image size in this example is therefore the adjusted object image size*pixel size=2217.09*0.0082=18.18 mm, or approximately 0.7 inches.

Figure 5:
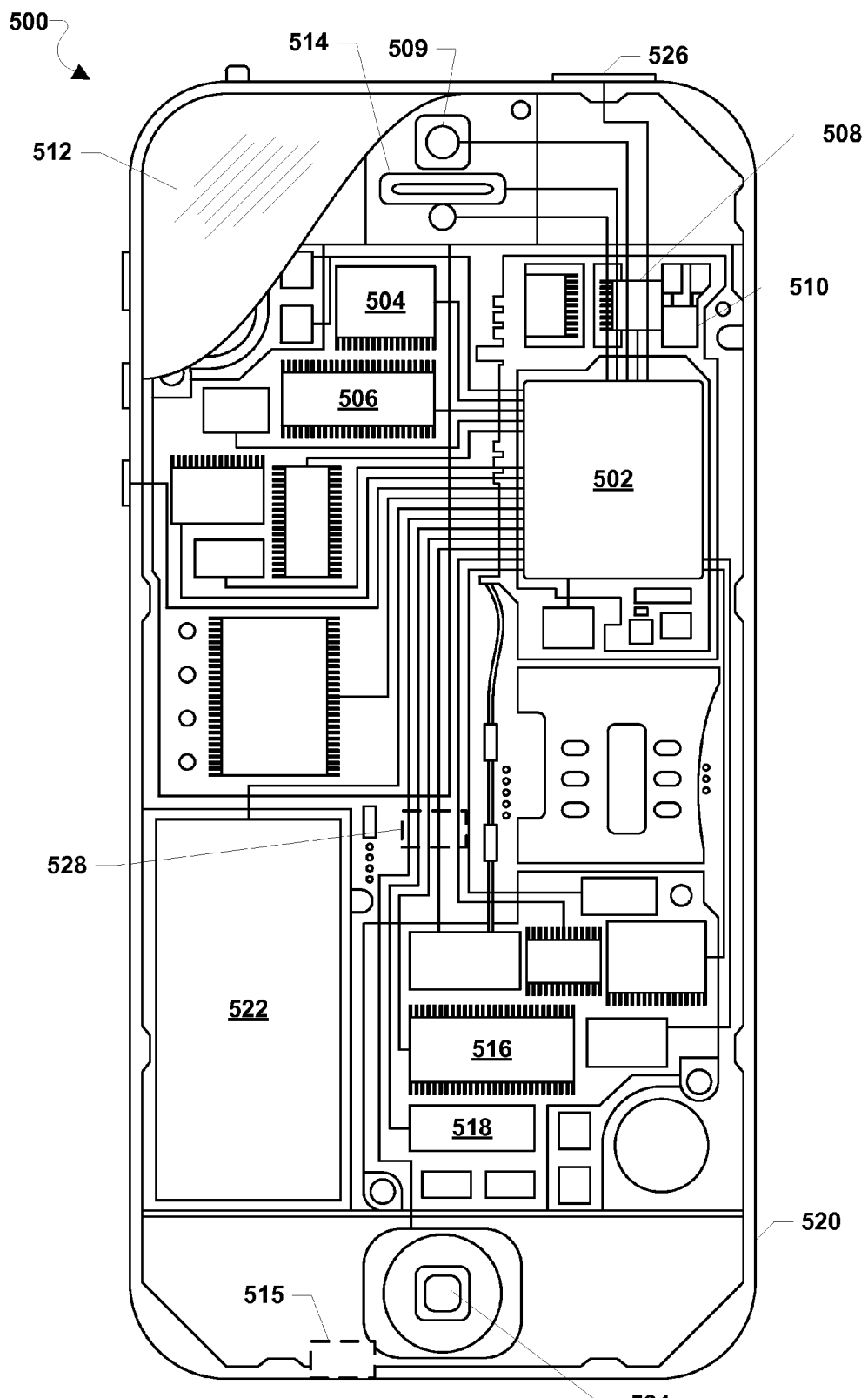
FIG. 5 is a component diagram of an example mobile computing device suitable for use with various embodiments.

Various embodiments may use any of a variety of mobile computing devices (e.g., smartphones, tablets, etc.), an example in the form of a smartphone or mobile computing device 500 is illustrated in FIG. 5. With reference to FIGS. 1A-1E, 2A-2D, 3A-3B, and 4A-4E, the mobile computing device 500 may include a processor 502 coupled to the various systems of the mobile computing device 500. For example, the processor 502 may be coupled to a touch screen controller 504, radio communication elements, speakers and microphones, and an internal memory 506. The processor 502 may be one or more multi-core integrated circuits designated for general or specific processing tasks. The internal memory 506 may be volatile or non-volatile memory, and may also be secure and/or encrypted memory, or unsecure and/or unencrypted memory, or any combination thereof. In another embodiment (not shown), the mobile computing device 500 may also be coupled to an external memory, such as an external hard drive.

The touch screen controller 504 and the processor 502 may also be coupled to a touch screen panel 512, such as a resistive-sensing touch screen, capacitive-sensing touch screen, infrared sensing touch screen, etc. The mobile computing device 500 may have one or more radio signal transceivers 508 (e.g., Peanut, Bluetooth, Bluetooth LE, Zigbee, Wi-Fi, RF radio, etc.) and antennae 510, for sending and receiving communications, coupled to each other and/or to the processor 502. The radio signal transceivers 508 and antennae 510 may be used with the above-mentioned circuitry to implement the various wireless transmission protocol stacks and interfaces. The mobile computing device 500 may include a cellular network wireless modem chip 516 that enables communication via a cellular network and is coupled to the processor.

The mobile computing device 500 may include a peripheral device connection interface 518 coupled to the processor 502. The peripheral device connection interface 518 may be singularly configured to accept one type of connection, or may be configured to accept various types of physical and communication connections, common or proprietary, such as USB, FireWire, Thunderbolt, or PCIe. The peripheral device connection interface 518 may also be coupled to a similarly configured peripheral device connection port (not shown).

In some embodiments, the mobile computing device 500 may include a microphone 515 for receiving voice or other audio frequency energy from a user during a call. The microphone 515 may be a piezo-electric transducer, or other conventional microphone elements. The mobile computing device 500 may also include speakers 514 for providing audio outputs. The mobile computing device 500 may also include a housing 520, constructed of a plastic, metal, or a combination of materials, for containing all or some of the components discussed herein. The mobile computing device 500 may include a power source 522 coupled to the processor 502, such as a disposable or rechargeable battery. The rechargeable battery may also be coupled to the peripheral device connection port to receive a charging current from a source external to the mobile computing device 500. The mobile computing device 500 may also include a physical button 524 for receiving user inputs. The mobile computing device 500 may also include a power button 526 for turning the mobile computing device 500 on and off.

In some embodiments, the mobile computing device 500 may further include an accelerometer 528, which senses movement, vibration, and other aspects of the computing device through the ability to detect multi-directional values of and changes in acceleration. In the various embodiments, the accelerometer 528 may be used to determine the x, y, and z positions of the mobile computing device 500. Using the information from the accelerometer, a pointing direction of the mobile computing device 500 may be detected.

The mobile computing device 500 may also include at least one camera 509. The camera 509 may be configured to capture images or video such that a user's finger may be identified and feature lengths calculated as described herein. The camera 509 may be a camera with a fixed or movable lens. The camera 509 may be a camera with a fixed or adjustable aperture. The camera 509 may be a camera with or without a shutter mechanism. The camera 509 may be configured with a camera device driver that may facilitate control of the camera by the processor 502 and that may maintain a table or data structure of camera parameters. The camera parameters may be updated when required. For example, if the camera 509 is configured with a movable lens, control actions to move the lens may result in changing of at least some of the camera parameters.

Figure 6:
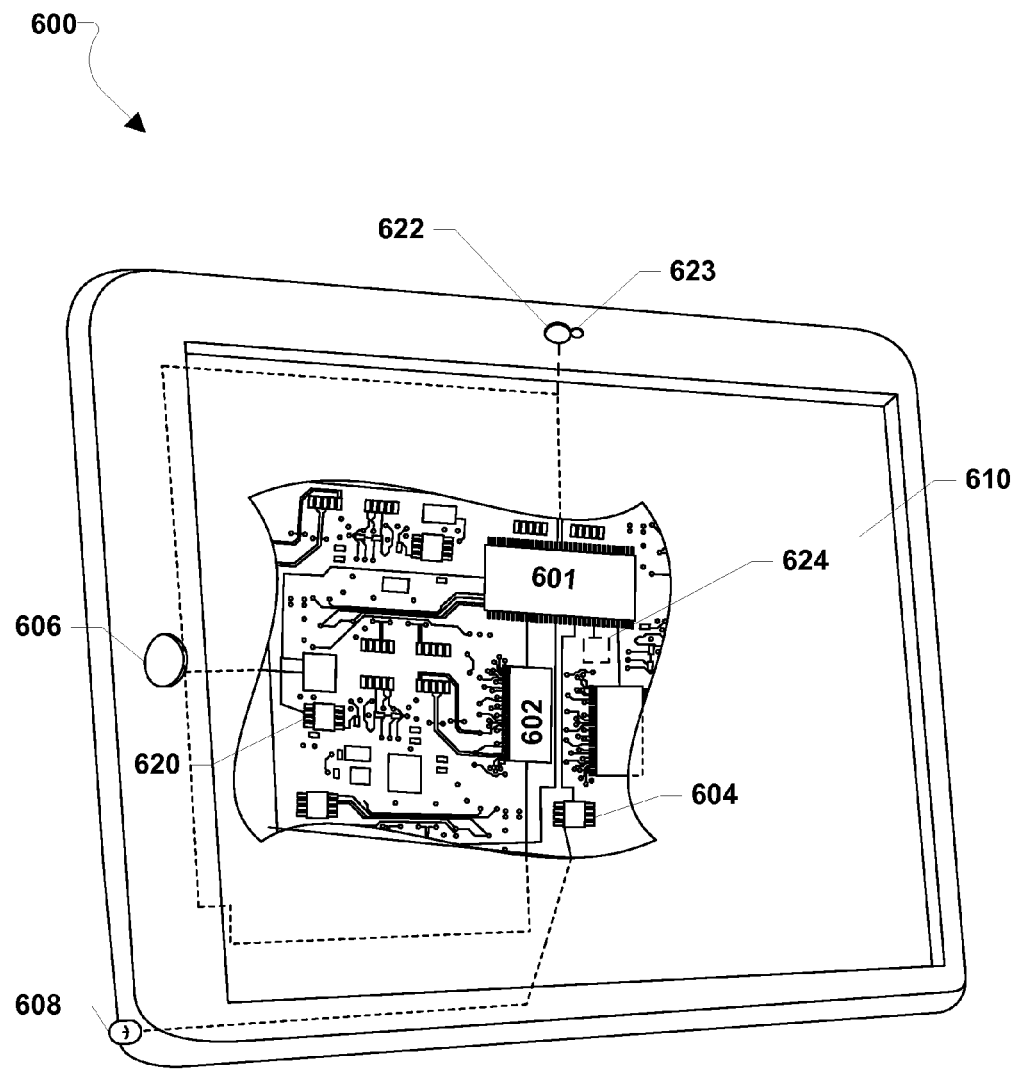
FIG. 6 is a component diagram of an example mobile tablet computing device suitable for use with various embodiments.

The various embodiments may alternatively or additionally be implemented in any of a variety of tablet mobile computing devices, an example of which (600) is illustrated in FIG. 6. For example, a tablet mobile computing device 600 may include a processor 601 coupled to internal memory 602. The internal memory 602 may be volatile or non-volatile memory, and may also be secure and/or encrypted memory, or unsecure and/or unencrypted memory, or any combination thereof. The processor 601 may also be coupled to a touch screen display 610, such as a resistive-sensing touch screen, capacitive-sensing touch screen infrared sensing touch screen, etc. The tablet mobile computing device 600 may have one or more radio signal transceivers 604 (e.g., Peanut, Bluetooth, Zigbee, Wi-Fi, RF radio) and antennas 608 for sending and receiving wireless signals as described herein. The radio signal transceivers 604 and antennas 608 may be used with the above-mentioned circuitry to implement the various wireless transmission protocol stacks and interfaces. The tablet mobile computing device 600 may include a cellular network wireless modem chip 620 that enables communication via a cellular network. The tablet mobile computing device 600 may also include a physical button 606 for receiving user inputs. The tablet mobile computing device 600 may also include various sensors coupled to the processor 601, such as at least one camera 622, at least one microphone 623, and an accelerometer 624.

The camera 622 may be configured to capture images or video such that a user's finger may be identified and feature lengths calculated as described herein. The camera 622 may be a camera with a fixed or movable lens. The camera 622 may be a camera with a fixed or adjustable aperture. The camera 622 may be a camera with or without a shutter mechanism. The camera 622 may be configured with a camera device driver that may facilitate control of the camera by the processor 601 and that may maintain a table or data structure of camera parameters. The camera parameters may be updated when required. For example, if the camera 622 is configured with a movable lens, control actions to move the lens may result in changing of at least some of the camera parameters.

For example, the tablet mobile computing device 600 may have a microphone 623 for receiving voice or other audio frequency energy from a user during a call or other voice frequency activity. The microphone 623 may be piezo-electric transducers, or other conventional microphone elements. Also in some embodiments, the tablet mobile computing device 600 may further include the accelerometer 624, which senses movement, vibration, and other aspects of the tablet mobile computing device 600 through the ability to detect multi-directional values of and changes in acceleration. In the various embodiments, the accelerometer 624 may be used to determine the x, y, and z positions of the tablet mobile computing device 600. Using the information from the accelerometer 624, a pointing direction of the tablet mobile computing device 600 may be detected.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of adjusting a size of one or more keys of a soft keyboard presented on a display of a computing device, comprising:
    calculating, by a processor of the computing device, a dimension of a finger feature of a finger of a user of the computing device from an image of the finger captured in an image frame of a camera of the computing device based on parameters of the camera of the computing device comprising:
        calculating an object distance of the finger of the user from a lens of the camera based on at least a focal length of the camera and an image distance of the camera comprising:
            focusing the camera of the computing device on the finger of the user;
            determining the focal length of the camera when focused on the finger; and
            calculating the object distance from the camera to the finger based upon the determined focal length; and
        calculating, by the processor, the dimension of the finger feature based on at least the object distance of the finger of the user from the lens of the camera, a width of a camera sensor of the camera in pixels, a width of the finger feature in pixels, an angle of a field of view of the camera;
    determining, by the processor, a size of the finger of the user based on the calculated dimension of the finger feature; and
    adjusting, by the processor, the size of one or more keys of the soft keyboard based on the determined size of the finger of the user.

2. The method of claim 1, further comprising:
    searching, by the processor, the image frame of the camera to find the finger of the user; and
    identifying, by the processor, the finger feature in response to finding the finger of the user in the image frame.

3. The method of claim 1, wherein determining, by the processor, the size of the finger of the user based on the calculated dimension of the finger feature comprises approximating the size of the finger of the user based on an outline of the finger of the user and the calculated dimension of the finger feature.

4. The method of claim 1, wherein adjusting, by the processor, the size of one or more keys of the soft keyboard based on the determined size of the finger of the user comprises:
    comparing the determined finger size to a standard finger size;
    increasing the size of one or more keys of the soft keyboard in response to the determined size of the finger of the user being larger than a standard finger size; and decreasing the size of one or more keys of the soft keyboard in response to the determined size of the finger of the user being smaller than a standard finger size.

5. The method of claim 1, wherein adjusting, by the processor, the size of one or more keys of the soft keyboard based on the determined size of the finger of the user comprises:
   generating, by the processor, a display overlay that prompts a user to move the finger of the user in front of the camera such that the image of the finger of the user moves within the display overlay; and
   adjusting, by the processor, the size of one or more keys of the soft keyboard based on a movement of the finger of the user within the display overlay.

6. The method of claim 1, wherein the finger feature comprises one of a distal interphalangeal crease and a proximal interphalangeal crease.

7. A computing device comprising:
   a camera;
   a display;
   a memory; and
   a processor coupled to the camera, the display, and the memory, the processor configured with processor-executable instructions to perform operations comprising:
      calculating a dimension of a finger feature of a finger of a user of the computing device from an image of the finger captured in an image frame of a camera of the computing device based on parameters of the camera of the computing device comprising:
         calculating an object distance of the finger of the user from a lens of the camera based on at least a focal length of the camera and an image distance of the camera comprising:
            focusing the camera of the computing device on the finger of the user;
            determining the focal length of the camera when focused on the finger; and
            calculating the object distance from the camera to the finger based upon the determined focal length; and
         calculating, by the processor, the dimension of the finger feature based on at least the object distance of the finger of the user from the lens of the camera, a width of a camera sensor of the camera in pixels, a width of the finger feature in pixels, an angle of a field of view of the camera;
      determining a size of the finger of the user based on the calculated dimension of the finger feature; and
      adjusting a size of one or more keys of a soft keyboard presented on the display based on the determined size of the finger of the user.

8. The computing device of claim 7, wherein the processor is configured with processor-executable instructions to perform operations further comprising:
   searching the image frame of the camera to find the finger of the user; and
   identifying the finger feature in response to finding the finger of the user in the image frame.

9. The computing device of claim 7, wherein the processor is configured with processor-executable instructions to perform operations such that determining the size of the finger of the user based on the calculated dimension of the finger feature comprises approximating the size of the finger of the user based on an outline of the finger of the user and the calculated dimension of the finger feature.

10. The computing device of claim 7, wherein the processor is configured with processor-executable instructions to perform operations such that adjusting the size of one or more keys of the soft keyboard based on the determined size of the finger of the user comprises:
    comparing the determined finger size to a standard finger size;
    increasing the size of one or more keys of the soft keyboard in response to the determined size of the finger of the user being larger than the standard finger size; and
    decreasing the size of one or more keys of the soft keyboard in response to the determined size of the finger of the user being smaller than the standard finger size.

11. The computing device of claim 7, wherein the processor is configured with processor-executable instructions to perform operations such that adjusting the size of one or more keys of the soft keyboard based on the determined size of the finger of the user comprises:
    generating a display overlay that prompts the user to move the finger of the user in front of the camera such that the image of the finger of the user moves within the display overlay; and
    adjusting the size of one or more keys of the soft keyboard based on a movement of the finger of the user within the display overlay.

12. The computing device of claim 7, wherein the finger feature comprises one of a distal interphalangeal crease and a proximal interphalangeal crease.

13. A non-transitory processor-readable storage medium having stored thereon processor-executable instructions configured to cause a processor of a computing device to perform operations comprising:
    calculating a dimension of a finger feature of a finger of a user of the computing device from an image of the finger captured in an image frame of a camera of the computing device based on parameters of the camera of the computing device comprising:
       calculating an object distance of the finger of the user from a lens of the camera based on at least a focal length of the camera and an image distance of the camera comprising:
          focusing the camera of the computing device on the finger of the user;
          determining the focal length of the camera when focused on the finger; and
          calculating the object distance from the camera to the finger based upon the determined focal length; and
       calculating, by the processor, the dimension of the finger feature based on at least the object distance of the finger of the user from the lens of the camera, a width of a camera sensor of the camera in pixels, a width of the finger feature in pixels, an angle of a field of view of the camera;
    determining a size of the finger of the user based on the calculated dimension of the finger feature; and
    adjusting a size of one or more keys of a soft keyboard presented on a display of the computing device based on the determined size of the finger of the user.

14. The non-transitory processor-readable storage medium of claim 13, wherein the processor-executable instructions are configured to cause the processor of the computing device to perform operations further comprising:
    searching the image frame of the camera to find the finger of the user; and identifying the finger feature in response to finding the finger of the user by searching.

15. The non-transitory processor-readable storage medium of claim 13, wherein the processor-executable instructions are configured to cause the processor of the computing device to perform operations such that determining the size of the finger of the user based on the calculated dimension of the finger feature comprises approximating the size of the finger of the user based on an outline of the finger of the user and the calculated dimension of the finger feature.

16. The non-transitory processor-readable storage medium of claim 13, wherein the processor-executable instructions are configured to cause the processor of the computing device to perform operations such that adjusting the size of one or more keys of the soft keyboard based on the determined size of the finger of the user comprises:
   comparing the determined finger size to a standard finger size;
   increasing the size of one or more keys of the soft keyboard in response to the determined size of the finger of the user being larger than the standard finger size; and
   decreasing the size of one or more keys of the soft keyboard in response the determined size of the finger of the user being smaller than the standard finger size.

17. The non-transitory processor-readable storage medium of claim 13, wherein the processor-executable instructions are configured to cause the processor of the computing device to perform operations such that adjusting the size of one or more keys of the soft keyboard based on the determined size of the finger of the user comprises:
   generating a display overlay that prompts the user to move the finger of the user in front of the camera such that the image of the finger of the user moves within the display overlay; and
   adjusting the size of one or more keys of the soft keyboard based on a movement of the finger of the user within the display overlay.

* * * * *